United States Patent
Uozumi

(10) Patent No.: US 6,709,779 B2
(45) Date of Patent: Mar. 23, 2004

(54) COOLING DEVICE FOR FUEL CELL SYSTEM AND CONTROL METHOD THEREOF

(75) Inventor: Tetsuo Uozumi, Yokosuka (JP)

(73) Assignee: Nissan Motor Co., LTD, Kanawa (JP)

( * ) Notice: Subject to any disclaimer, the term of this patent is extended or adjusted under 35 U.S.C. 154(b) by 151 days.

(21) Appl. No.: 10/115,985

(22) Filed: Apr. 5, 2002

(65) Prior Publication Data

US 2002/0164511 A1 Nov. 7, 2002

(30) Foreign Application Priority Data

Apr. 12, 2001 (JP) ........................................ 2001-113495

(51) Int. Cl.[7] .............................................. H01M 8/04
(52) U.S. Cl. .................... 429/24; 48/17; 48/22; 48/26
(58) Field of Search ........................ 429/17, 22, 24, 429/26

(56) References Cited

FOREIGN PATENT DOCUMENTS

| JP | 6-140066 | * | 5/1994 | ............ H01M/8/04 |
| JP | 9-22716 | * | 1/1997 | ............ H01M/8/04 |

* cited by examiner

*Primary Examiner*—Patrick Ryan
*Assistant Examiner*—Dah-Wei D. Yuan
(74) *Attorney, Agent, or Firm*—McDermott, Will & Emery

(57) ABSTRACT

The efficiency of the fuel cell system is increased. This is enabled by controlling a bypass amount of cooling liquid for a conductivity reduction device such as an ion removal device in response to the operating state of the fuel cell system before the conductivity exceeds the permitted limiting value. The device is provided with a recirculation passage 10 which recirculates cooling liquid between a fuel cell 2 and a heat exchanger 5, a bypass passage 11 having an ion removal filter 4 therein, and a control device 1 which controls solenoids 6, 7 to increase a bypass ratio when the conductivity exceeds the permitted value.

14 Claims, 24 Drawing Sheets

COOLING DEVICE FOR FUEL CELL SYSTEM AND CONTROL METHOD THEREOF

FIELD OF THE INVENTION

This invention relates to a device and method for cooling a fuel cell stack of a fuel cell system.

BACKGROUND OF THE INVENTION

A fuel cell generates electrical energy through electrochemical reaction of hydrogen and oxygen. The fuel cell system is generally provided with a cooling device. The cooling device maintains a fuel cell stack of the fuel cell system to a substantially predetermined temperature when the fuel cell stack generates heat as a result of the electrochemical reactions. For example, in a fuel cell system comprising a polymer electrolyte fuel cell (PEFC) stack, the cooling device maintains a temperature of 80° C. while the fuel cell stack is operating. The cooling device has a recirculation system for a cooling liquid. The cooling liquid in the recirculation system is supplied to the fuel cell stack by a recirculation pump. After passing through the fuel cell, the cooling liquid extracts resultant heat with a heat exchanger such as a radiator. Thereafter the cooling liquid is returned to a tank.

Highly pure water is generally used as the cooling liquid. If the water displays high electrical conductivity, there is the possibility that the fuel cell may develop a short circuit. Short circuits in the fuel cell can reduce the amount of power generation or stop power generation entirely. A conductivity reduction device such as an ion removal filter is provided in the cooling liquid system in order to reduce the conductivity of the cooling liquid. Tokkai Hei 9-22716 published by the Japanese Patent Office in 1997 discloses such an ion removal filter. When the conductivity of the cooling liquid in this prior-art device reaches a permitted limiting value, an ion removal process is performed in order to reduce conductivity of the cooling water.

SUMMARY OF THE INVENTION

However the prior-art ion removal filter can not operate when the cooling device displays maximum cooling performance or when there is not a margin in power supply to the recirculation pump, even if the cooling liquid has reached a permitted limiting value. This is because cooling must be given priority or that there is insufficient excess power to drive the pump transferring cooling water to the ion removal filter. This problem tends to occur particularly in vehicle fuel cell system because it is difficult to ensure a high margin of power in a vehicle fuel cell system.

It is therefore an object of this invention to increase the operating efficiency of a conductivity reduction device of the cooling liquid that cools a fuel cell stack of a fuel cell system.

In order to achieve above object, this invention provides a cooling device for a fuel cell stack comprising a heat exchanger which cools the cooling medium, a cooling passage through which the cooling medium is circulated between the fuel cell stack and the heat exchanger, a pump which pressurize the cooling medium in the cooling passage for circulation, a bypass passage which bypasses the fuel cell stack to directly circulate a part of the cooling medium discharged from the pump to the heat exchanger, an electrical conductivity reducing mechanism which reduces electrical conductivity of the cooling medium passing through the bypass passage, a valve which regulates a bypass amount of the cooling medium passing through the bypass passage, a sensor which detects an electrical conductivity of the cooling medium and a programmable controller.

The controller is programmed to determine if the electrical conductivity is larger than a predetermined conductivity, control the valve to increase the bypass amount when the electrical conductivity is larger than the predetermined conductivity, determine if a predetermined condition related to an operation of the fuel cell stack holds, and control the valve to prevent the bypass amount from becoming zero when the electrical conductivity is not larger than the predetermined conductivity and the predetermined operation condition holds.

This invention also provides a control method for a cooling device which cools a fuel cell stack of a fuel cell system. The device comprises a heat exchanger which cools the cooling medium, a cooling passage through which the cooling medium is circulated between the fuel cell stack and the heat exchanger, a pump which pressurize the cooling medium in the cooling passage for circulation, a bypass passage which bypasses the fuel cell stack to directly circulate a part of the cooling medium discharged from the pump to the heat exchange, an electrical conductivity reducing mechanism which reduces electrical conductivity of the cooling medium passing through the bypass passage, a valve which regulates a bypass amount of the cooling medium passing through the bypass passage. The method comprises detecting an electrical conductivity of the cooling medium, determining if the electrical conductivity is larger than a predetermined conductivity, controlling the valve to increase the bypass amount when the electrical conductivity is larger than the predetermined conductivity, determining if a predetermined condition related to an operation of the fuel cell stack holds, and controlling the valve to prevent the bypass amount from becoming zero when the electrical conductivity is not larger than the predetermined conductivity and the predetermined operation condition holds.

The details as well as other features and advantages of this invention are set forth in the remainder of the specification and are shown in the accompanying drawings.

DESCRIPTION OF THE PREFERRED EMBODIMENTS

Figure 1:
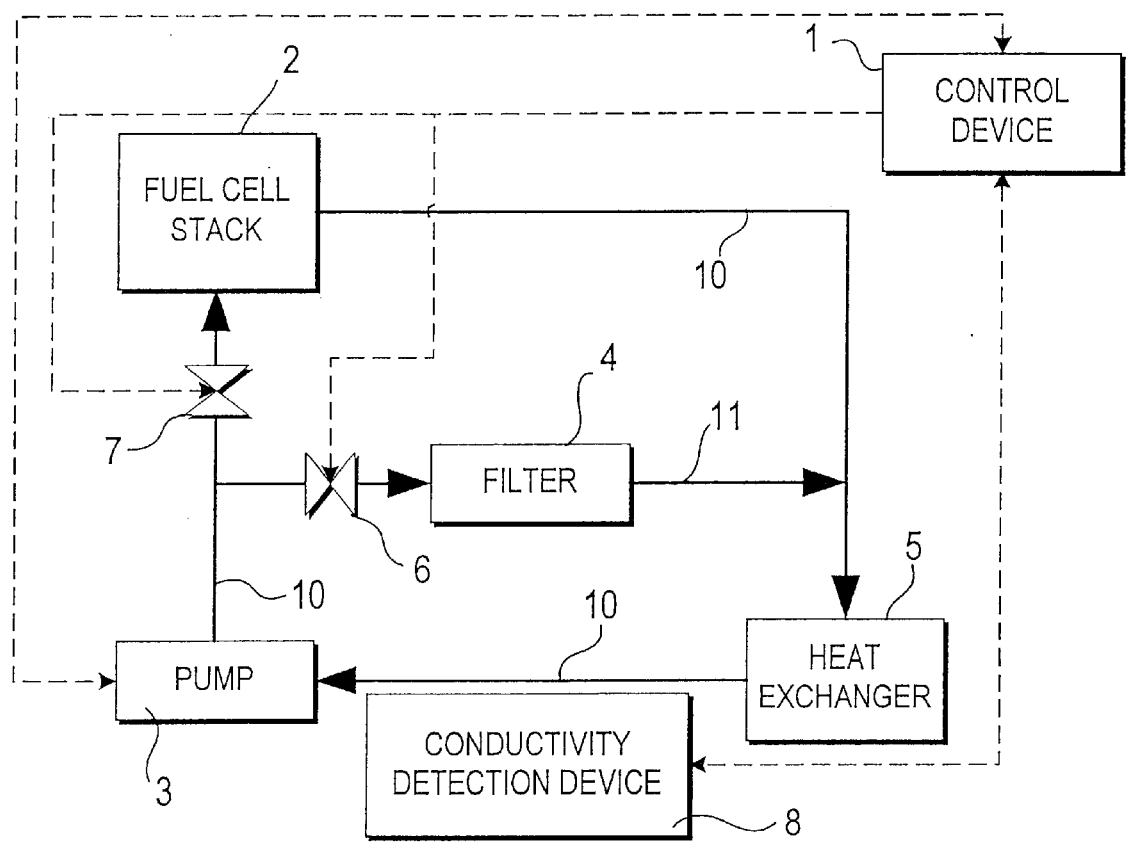
FIG. 1 is a schematic diagram of a fuel cell system according to a first embodiment of this invention.

Referring to FIG. 1 of the drawings, a fuel cell system comprises a control device 1, a fuel cell stack 2, an electrical recirculation pump 3, an ion removal filter 4, a heat exchanger 5, solenoid valves 6 and 7, a conductivity sensor 8, a recirculation passage 10 and a bypass passage 11.

The control device 1 is a microcomputer having a central processing unit (CPU), a read only memory (ROM), a random access memory (RAM) and an input/output interface (I/O) interface. The controller may comprise a plurality of such microcomputers.

The fuel cell stack 2 generates power by electro-chemical reactions. The electrical recirculation pump 3 pressurizes a cooling liquid such as pure water. The ion removal filter 4 functioning as a conductivity reduction mechanism reduces the conductivity of the cooling liquid. The heat exchanger 5 cools the cooling liquid by exchanging heat of the cooling liquid with atmosphere. The recirculation passage 10 recirculates the cooling liquid between the recirculation pump 3 and the heat exchanger 5 via the fuel cell stack 2. The solenoid valve 7 is disposed in the recirculation passage 10 between the recirculation pump 3 and the fuel cell stack 2. The bypass passage 11 provides a short-cut that bypasses the fuel cell stack 2 and directly connects the recirculation pump 3 and the heat exchanger 5. The solenoid valve 6 and the ion removal filter 4 are disposed in series in the bypass passage 11. The conductivity sensor 8 detects conductivity in the cooling liquid in the recirculation passage 10. Due to the above construction, a part of the cooling liquid is diverted in response to the operation of the solenoid valves 6, 7 from the recirculation passage 10 to the bypass passage 11, processed by the ion removal filter 4 and recirculated to the pump 3 via the heat exchanger 5. The broken line in the figure shows the signal route of the control system.

The rotation speed of the recirculation pump 3 is adapted to undergo variable control in response to a required output. The control device 1 determines a command value of the rotation speed in response to the operating conditions of the fuel cell stack 2 or the cooling liquid temperature and outputs a command value for the rotation speed to the recirculation pump 3. This allows a control device 1 to control the operation of the recirculation pump 3. The generated power of the fuel cell stack 2 is used as power for driving the recirculation pump 3 and various types of other electronic devices.

In order to suppress the temperature increase of the fuel cell stack 2 resulting from electrochemical reactions in the fuel cell stack 2, the recirculation pump 3 recirculates the cooling liquid between the heat exchanger 5 and the fuel cell stack 2. The conductivity of the cooling liquid is suppressed to a low level in order to prevent reductions in power generation due to short circuits in the fuel cell that are apt to occur when the conductivity of the cooling liquid becomes high. Since an external pure water production device for supplying low-conductivity cooling liquid to the fuel cell system can not be mounted in a moving body such as an automobile, it is necessary to maintain a low level of conductivity in the cooling liquid of the fuel cell system. The conductivity of the cooling liquid increases over time when the cooling liquid is left standing, since conducting ions enter the cooling liquid from the metal pipes or heat exchangers. The ion removal filter 4 has the function of removing such conducting ions.

The control device 1 performs multi-step/continuous variable control of the opening of the solenoid valves 6, 7 by outputting a command value signal to each of the valves 6, 7 and therefore regulates the flowrate of the cooling liquid in the bypass passage 11 and the flowrate of the cooling liquid in the recirculation passage 10. The control device 1 can control the opening of the solenoid valves 6, 7 from a state in which the recirculation passage 10 is fully open and the bypass passage 11 is fully closed to the reverse state. Instead of providing two solenoid valves 6, 7 it is possible to provide a single three-way solenoid valve in the branching section of the passage 10 and 11. The three-way solenoid valve may also allow for continuous variation of the opening.

The conductivity sensor 8 may comprise a conductivity meter which measures the electrical resistance of the cooling liquid. Alternatively, the conductivity sensor 8 may forecast and/or measure the conductivity by the means or method described hereafter.

The control device 1 calculates a command value for the solenoid valves 6, 7 based on the conductivity of the cooling liquid detected by the conductivity sensor 8. Based on the conductivity of the cooling liquid, the control device 1 determines a bypass ratio of the cooling liquid, i.e., the ratio of the flowrate of the cooling liquid in the bypass passage 11 with respect to the flowrate of the cooling liquid discharged from the recirculation pump 3.

Figure 2:
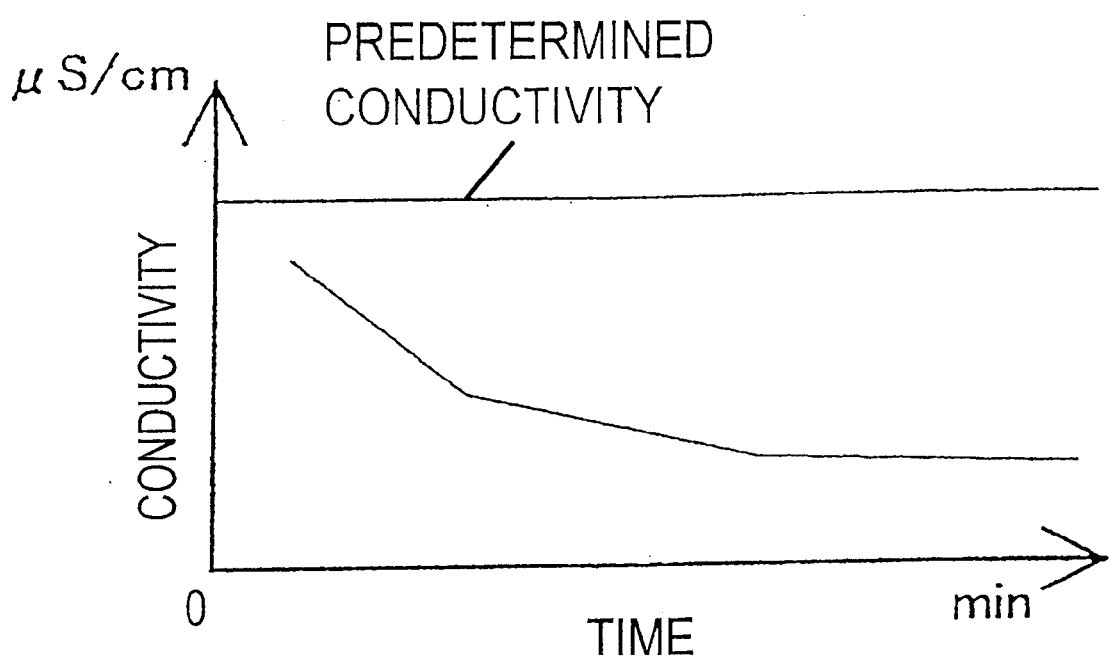
FIG. 2 is a graph showing a variation in conductivity of cooling liquid according to the first embodiment of this invention.

In the first embodiment, even when the conductivity is lower than a permitted upper limiting value, the control device 1 regulates the opening of the solenoid valves 6, 7 so that a specified flow amount of the cooling liquid flows to the ion removal filter 4 in response to the operating condition of the fuel cell system. By preventing the flowrate of the cooling liquid flowing to the ion removal filter 4 from becoming zero as long as the cooling efficiency for the fuel cell stack does not deteriorate, as shown in FIG. 2, the conductivity is maintained to a low level at all times and the generation of a leakage current in the fuel cell stack 2 is suppressed.

The permitted upper limiting value of the conductivity is given by the following relation:

$$\text{permitted upper limiting value} = \frac{A1}{V1} \cdot \frac{L1}{S1}$$

where,
V1=cell voltage,
A1=permitted leakage current,
L1=distance between adjacent cells, and
S1=total area of cooling passage lying between adjacent cells.

Providing that V1 is 1.0 volt/cell, A1 is 0.1 milliamperes, L1 is 0.1 centimeters, S1 is 2 square centimeters, the permitted upper limiting value is 5 micro siemenses per square centimeter.

Furthermore, in the same manner as the prior-art device, when the conductivity exceeds the permitted upper limiting value, the control device 1 controls the opening of the solenoid valves 6, 7 in order to increase the bypass ratio of cooling liquid flowing to the ion removal filter 4.

Referring to the flowchart of FIG. 3, the conductivity control routine performed by the control device 1 will now be described. The routine is repeated at a predetermined interval of five seconds.

First, in a step S1, the conductivity, which is measured or predicted, is read. In a step S2, it is determined whether or not the conductivity is higher than the permitted upper limiting value. When the conductivity is higher than the permitted upper limiting value, the routine proceeds to a step S3 where the solenoid valves 6, 7 are commanded to increase the bypass ratio. On the other hand, when the result of the step S2 is negative, the routine proceeds to a step S4 where the subroutine for controlling the bypass ratio when the conductivity is not higher than the limiting value is performed in response to the operating condition of the fuel cell system.

Figure 4:
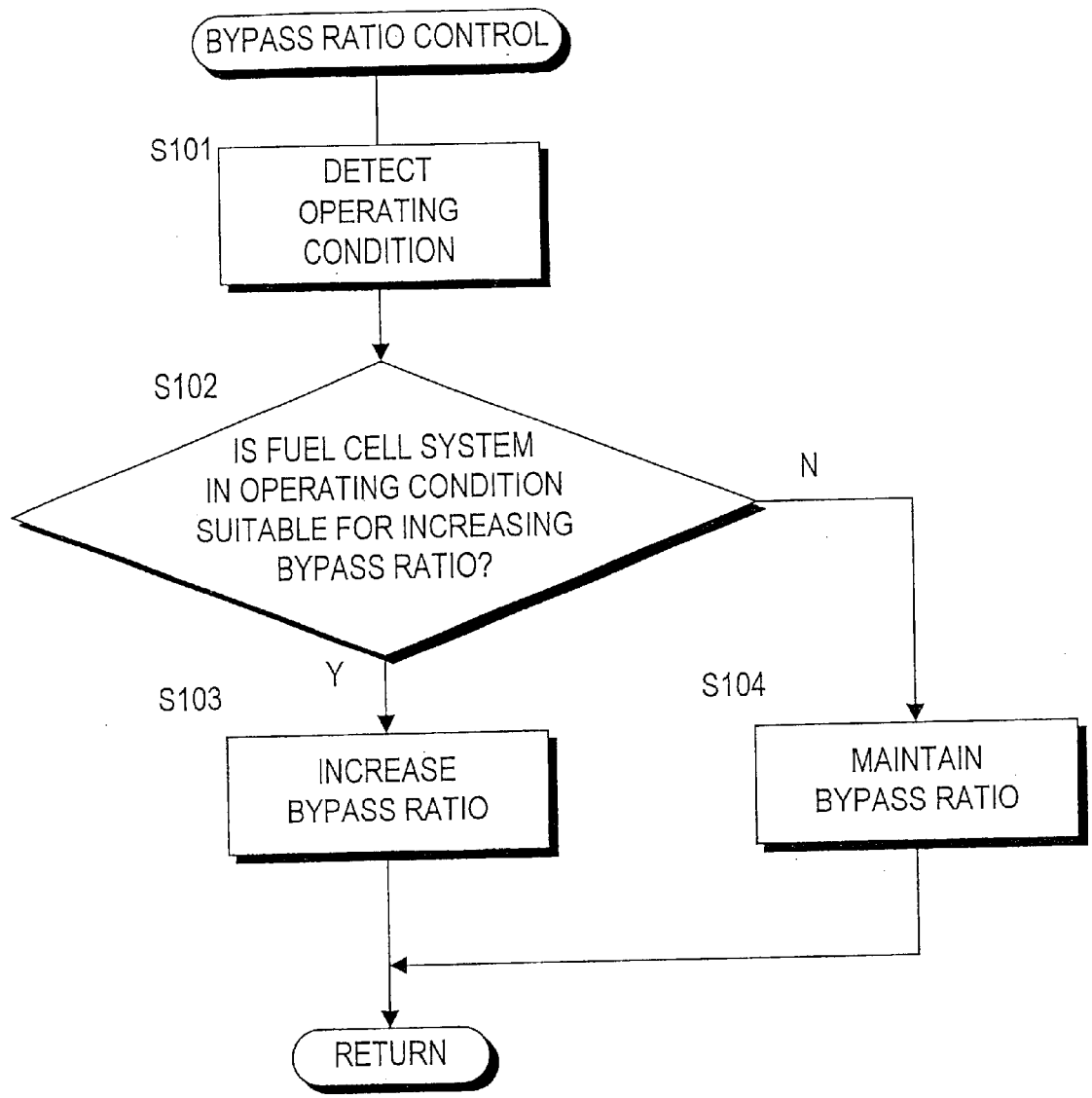
FIG. 4 is a flowchart describing a subroutine for bypass ratio control performed by the controller.

Referring to FIG. 4, the subroutine comprises steps S101 to S104. In a step S101, the operating condition of the fuel cell system is detected. Next, in a step S102, it is determined whether or not the operating condition permits the increase in the bypass ratio. In other words, it is determined whether or not the fuel cell system is in an operating condition suitable for increasing the bypass ratio.

When the operating condition permits the increase in bypass ratio, the subroutine proceeds to a step S103 where the solenoid valves 6, 7 are commanded to increase the bypass ratio. The increase of the bypass ratio causes a decrease in conductivity.

On the other hand, when the result of the step S102 is negative in the step S102, the routine proceeds to a step S104 where the solenoid valves 6, 7 are commanded to maintain bypass ratio. In the step S104, the solenoid valves 6, 7 may be commanded to decrease bypass ratio or to stop diversion of the cooling liquid to the bypass passage 11. Thus, the cooling efficiency for the fuel cell stack 2 is ensured.

Figure 5:
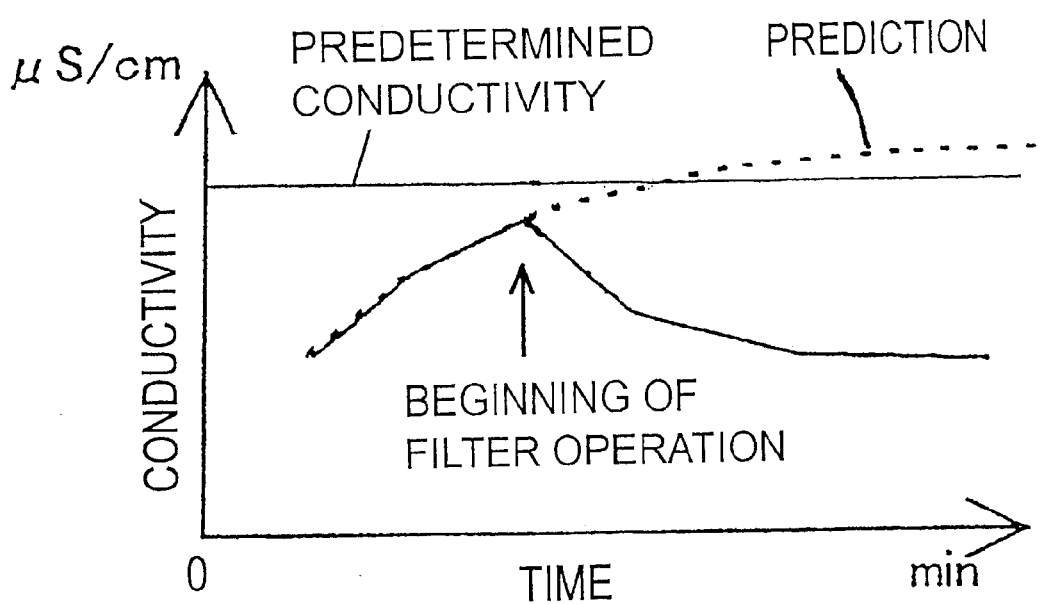
FIG. 5 is a graph of a variation in conductivity of the cooling liquid according to a second embodiment of this invention.

Referring now to FIG. 5, a second embodiment of this invention will be described. In this embodiment the control device 1 controls the solenoid valves 6, 7 in response to a predicted value for conductivity.

According to this embodiment, the conductivity detected by the conductivity sensor 8 is processed by the control device 1 so as to obtain a future value of the conductivity in a predetermined time period. Herein, the predetermined time period is set to thirty seconds. This value is hereafter referred to as a predicted conductivity. The control device 1 compares the predicted conductivity with the permitted upper limiting value. The control device 1 calculates the predicted conductivity by applying the current conductivity detected by the conductivity sensor 8 to a variation pattern previously stored in the memory of the control device 1.

The control device 1 commands the solenoid valves 6 and 7 to increase the bypass ratio of cooling liquid when the predicted conductivity exceeds the permitted upper limiting value. The control device 1 may also output an alarm signal to notify a driver of the vehicle that the predicted conductivity has exceeded the permitted upper limiting value.

In this manner, since the conductivity of the cooling liquid is reduced as shown in FIG. 5, the number of occasions on which the conductivity reaches the predefined value is reduced in comparison with the case of the first embodiment. Furthermore, according to this embodiment, it is possible to reduce the possibility of the system stopping due to high conductivity of the cooling liquid.

Figure 6:
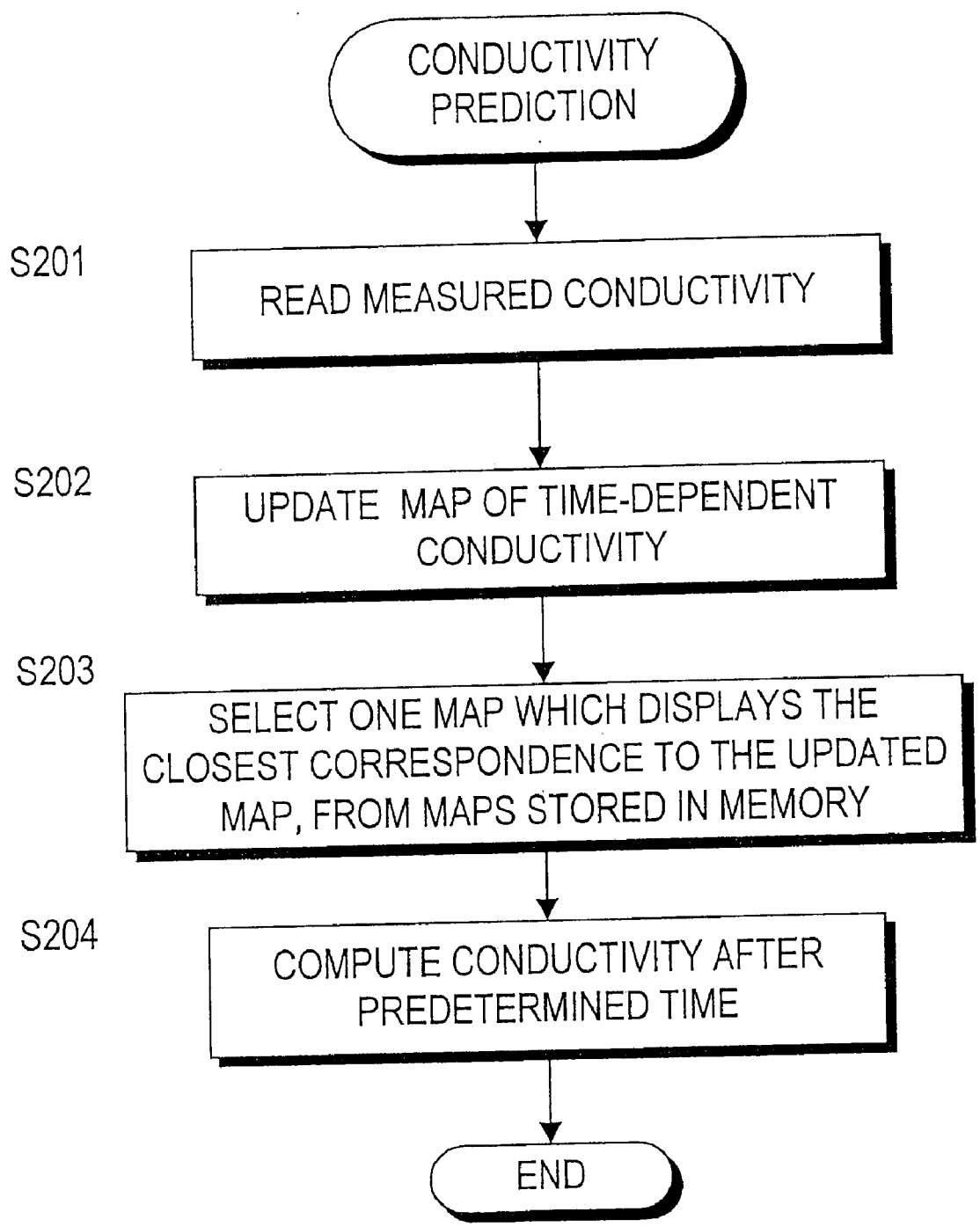
FIG. 6 is a flowchart describing a routine for predicting conductivity of the cooling liquid performed by a controller according to the second embodiment of this invention.

The flowchart of FIG. 6 shows a routine for predicting conductivity of cooling liquid. The routine is repeated at a predetermined interval of five seconds.

Firstly, in a step S201, the conductivity measured by the conductivity sensor 8 is read. In a step S202, a map specifying the relation between the conductivity and the time elapsed from the startup of the fuel cell system is updated by adding the data of the measured conductivity and present elapsed time. Thus, the map stored in the RAM is updated on every occasion when the measured conductivity is read. An example of the map is shown by the solid line in FIG. 5.

The control device 1 stores a plurality of maps that specify typical variation of the conductivity in the ROM.

In a step S203, one map from these maps is selected on the basis of displaying the closest correspondence to the map in the RAM. An example of the selected map is shown by the dashed line in FIG. 5.

In a step S204, on the basis of the selected map, the conductivity after a predetermined time has elapsed, i.e., the future value, is computed and stored in the RAM.

Figure 7:
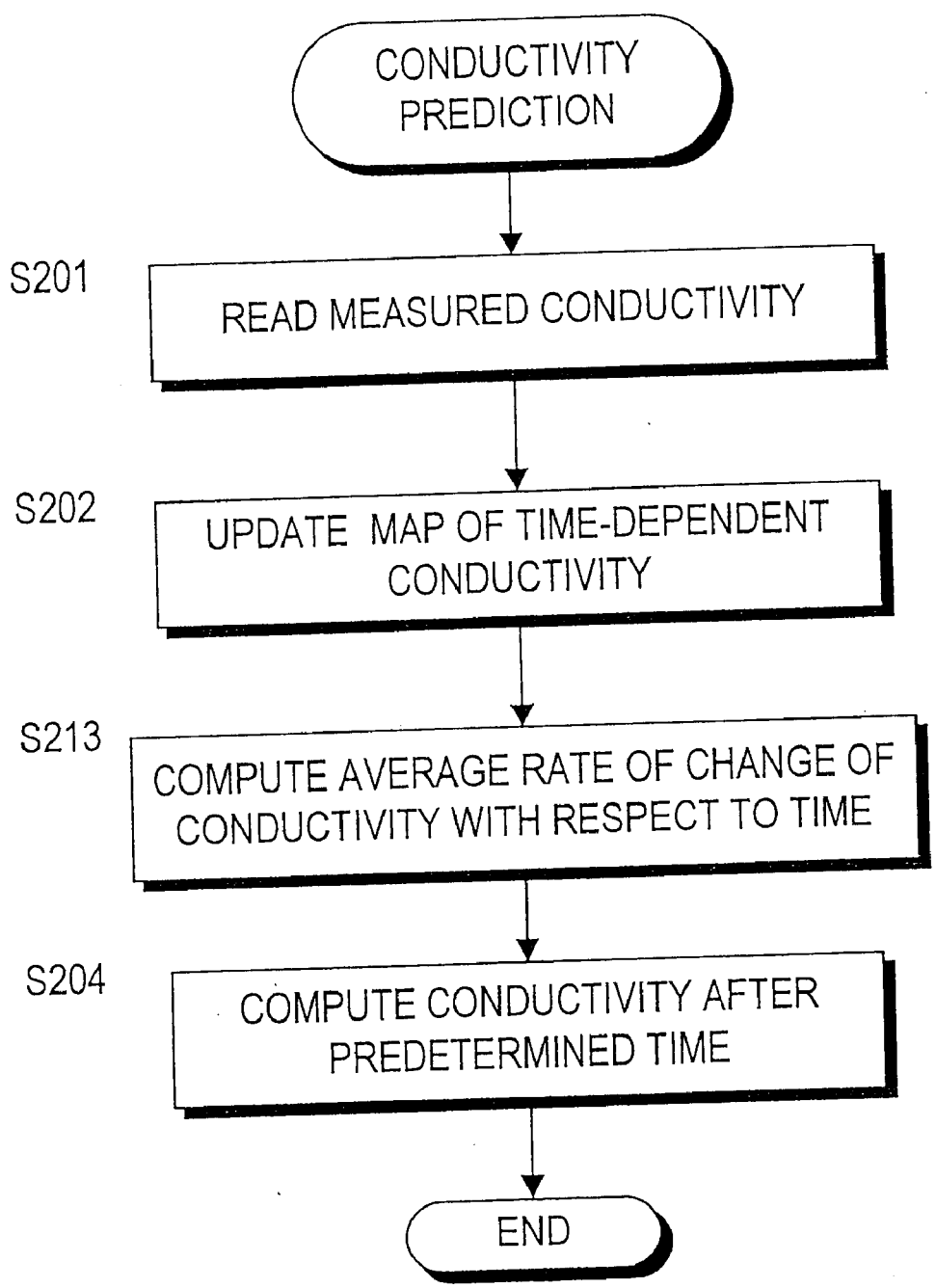
FIG. 7 is similar to FIG. 6 but showing an alternative routine for predicting conductivity of cooling liquid performed by the controller according to the second embodiment of this invention.

The flowchart of FIG. 7 shows another example of a routine for predicting the conductivity of the cooling liquid. The routine is repeated at a predetermined interval of five seconds.

In this flowchart the step S203 of FIG. 6 is replaced by a step S213. The other steps are identical to those of FIG. 6. In the step S213, the average rate of change in conductivity with respect to time is computed on the basis of the updated map in the RAM, after the processings of the steps S201 and S202. Next, in the step S204, the conductivity after a predetermined time has elapsed is computed from the average rate of change, and is stored in the RAM.

Figure 8:
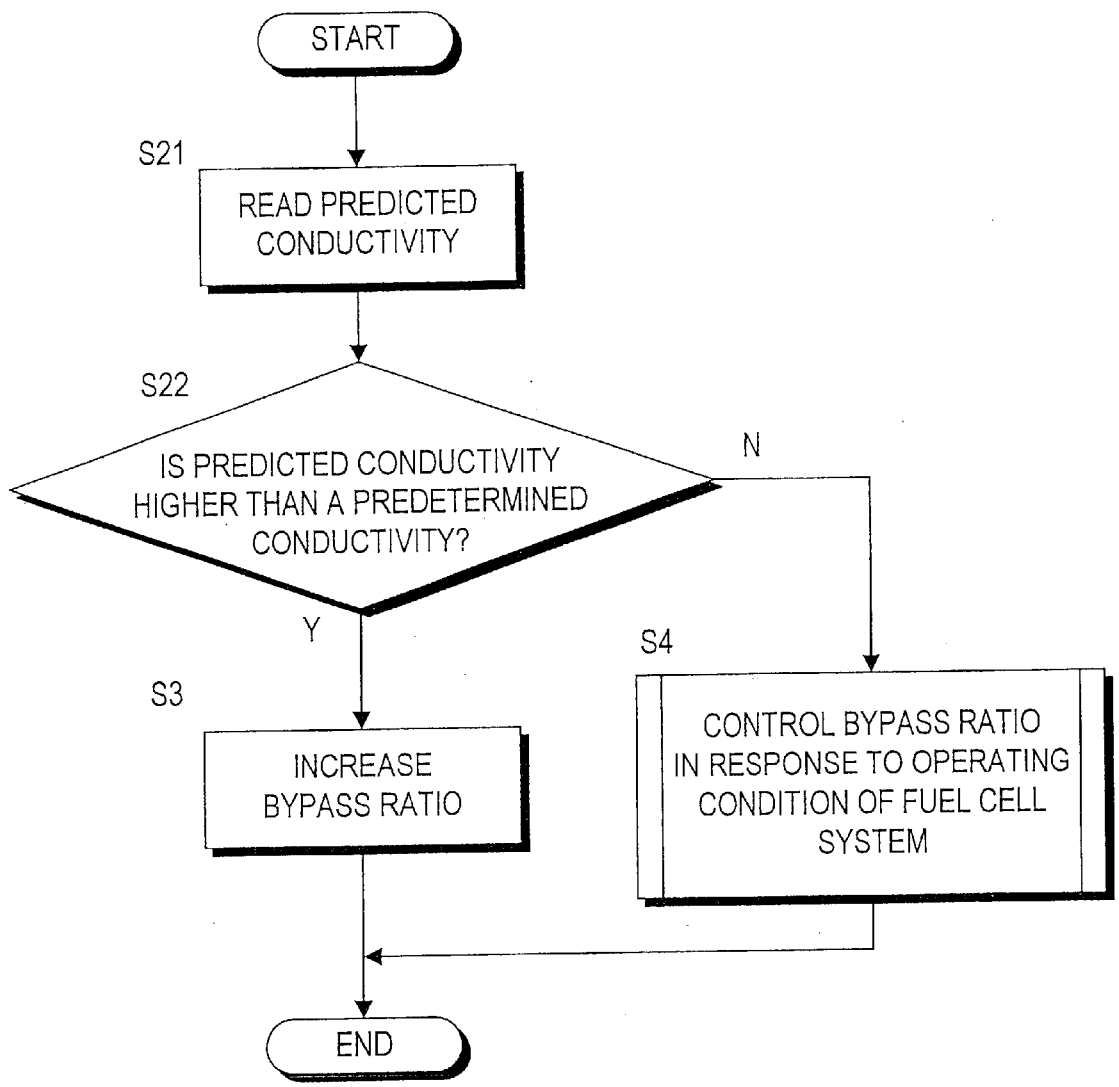
FIG. 8 is a flowchart describing a conductivity control routine performed by the controller according to the second embodiment of this invention.

Referring to the flowchart of FIG. 8, the conductivity control routine according to the second embodiment will now be described. The conductivity control routine is performed by the control device 1, and is repeated at a predetermined interval of five seconds.

Firstly, in a step S21, the conductivity after a lapse of the predetermined time, which is predicted by the routine of FIG. 6 or FIG. 7, is read. In a step S22, it is determined whether or not the predicted conductivity is higher than the permitted limiting value. When the predicted conductivity is higher than the predetermined limiting value, the routine proceeds to the step S3. When it is negative in the step S22, the routine proceeds to the step S4. The processings of the steps S3 and S4 are identical to those of FIG. 3 of the first embodiment.

Figure 9:
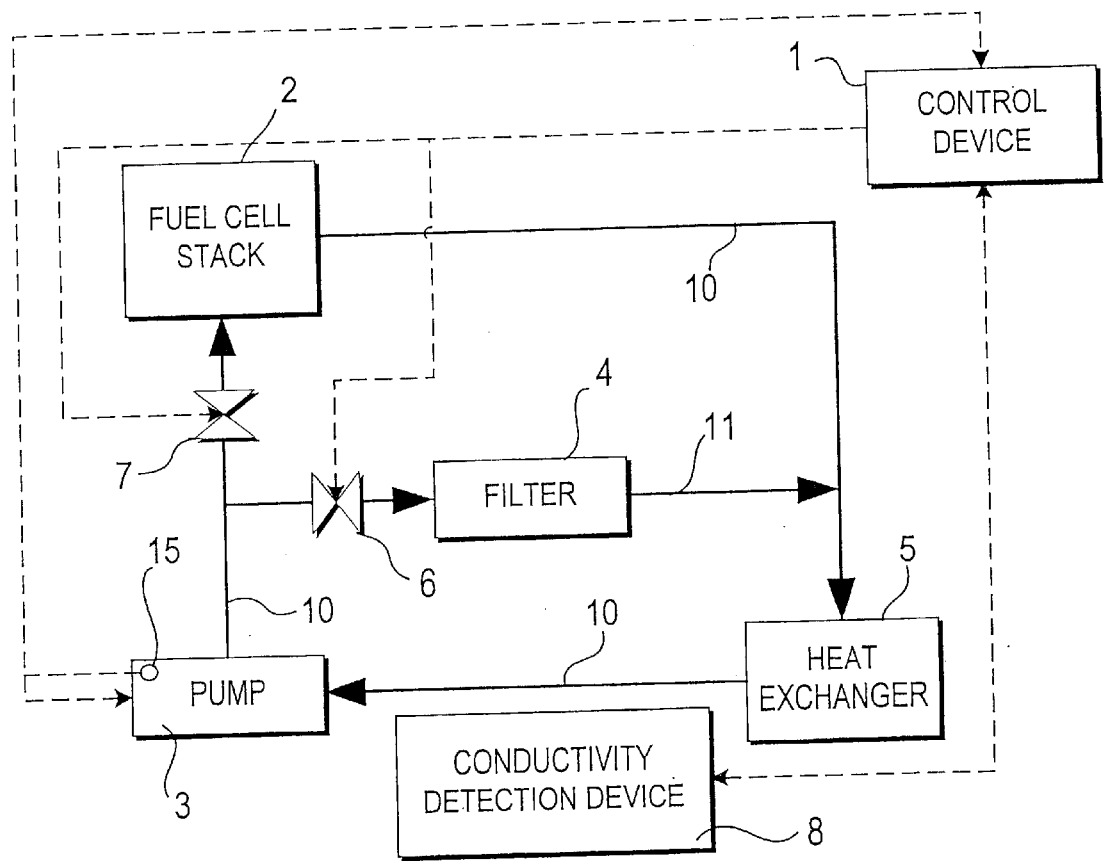
FIG. 9 is a schematic diagram of a fuel cell system according to a third embodiment of this invention.

Referring to FIG. 9, a third embodiment of this invention will be described. Although the third embodiment is based on the first or the second embodiment, the third embodiment is provided with an operating condition detection sensor, which detects the operating condition of the fuel cell system, specifically of the recirculation pump 3, and the control device 1 has the function of increasing the bypass ratio in response to the operating condition when the conductivity of the cooling liquid is not higher than the permitted limiting value.

The fuel cell system is provided with a load sensor 15 for detecting a load on the motor of the recirculation pump 3 as an operation condition detecting sensor and the load on the motor of the recirculation pump 3 is transmitted to the control device 1. The control device 1 calculates the margin in the pump performance on the basis of the load.

When cooling the fuel cell stack 2 does not require full pump performance, the driving power for the recirculation pump 3 is increased so that the margin in the pump performance is used for the reduction of conductivity of the cooling liquid. The control device 1 also controls the solenoid valves 6, 7 so that the bypass ratio of the cooling liquid to the ion removal filter 4 increases as the margin in pump performance increases.

In this manner, it is possible to promote reductions in the conductivity dependent upon the performance margin of the recirculation pump 3.

Figure 3:
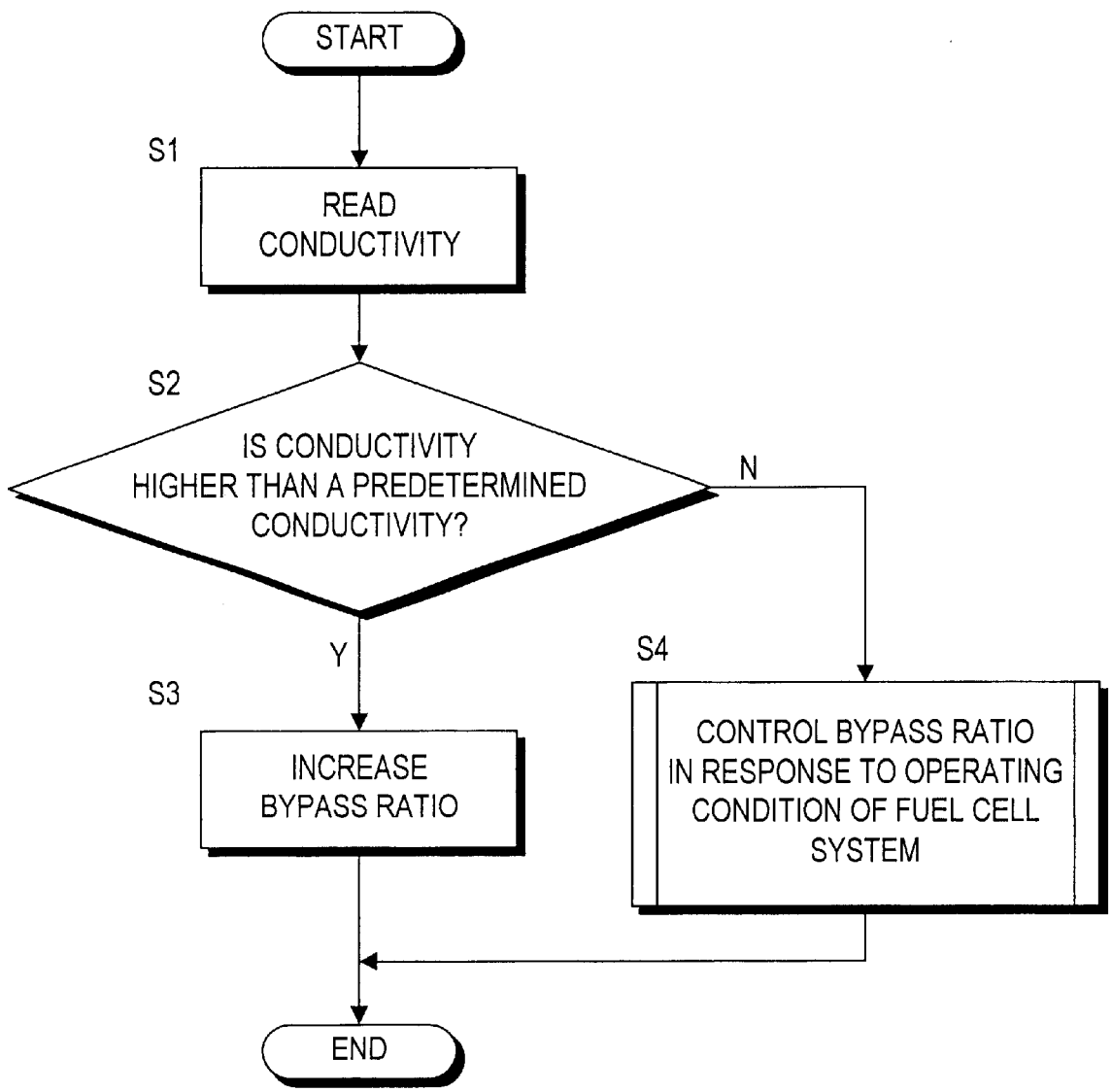
FIG. 3 is a flowchart describing a conductivity control routine performed by a controller according to the first embodiment of this invention.
Figure 10:
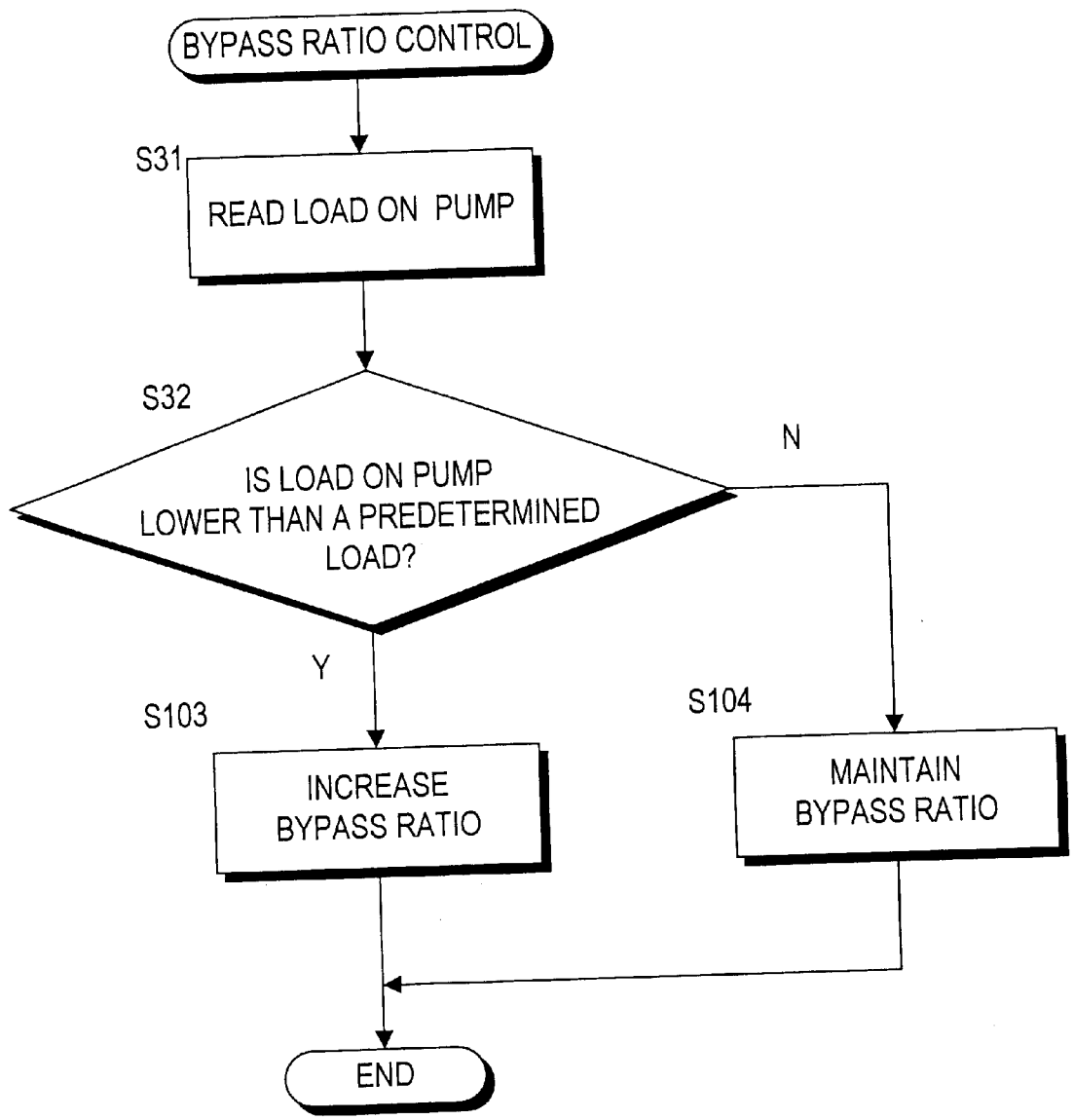
FIG. 10 is a flowchart describing a subroutine for bypass ratio control performed by the controller according to the third embodiment of this invention.

In order to realize the above control, the control device 1 performs a subroutine for bypass ratio control shown in FIG. 10 instead of the subroutine of FIG. 3 of the first embodiment.

In a step S31, the load on the motor of the recirculation pump 3, which is detected by the load sensor 15, is read. Next, in a step S32, it is determined whether or not the detected load is lower than a predetermined load. The predetermined load is a value for determining if the motor has a margin for increasing the bypass ratio of the cooling liquid. The predetermined load is herein set to eighty percent of the rated load of the motor. In other words, providing that the rated load of the motor is 1 kW, the predetermined load is set to 0.8 kW. When the detected load is lower than the predetermined load, the subroutine proceeds to the step S103. When it is negative in the step S32, the subroutine proceeds to the step S104. The processings of the step S103 and S104 are identical to those of FIG. 4.

Instead of using the performance margin in the motor driving the recirculation pump 3, it is possible to perform a similar control using a temperature or flow amount of the cooling liquid.

Figure 11:
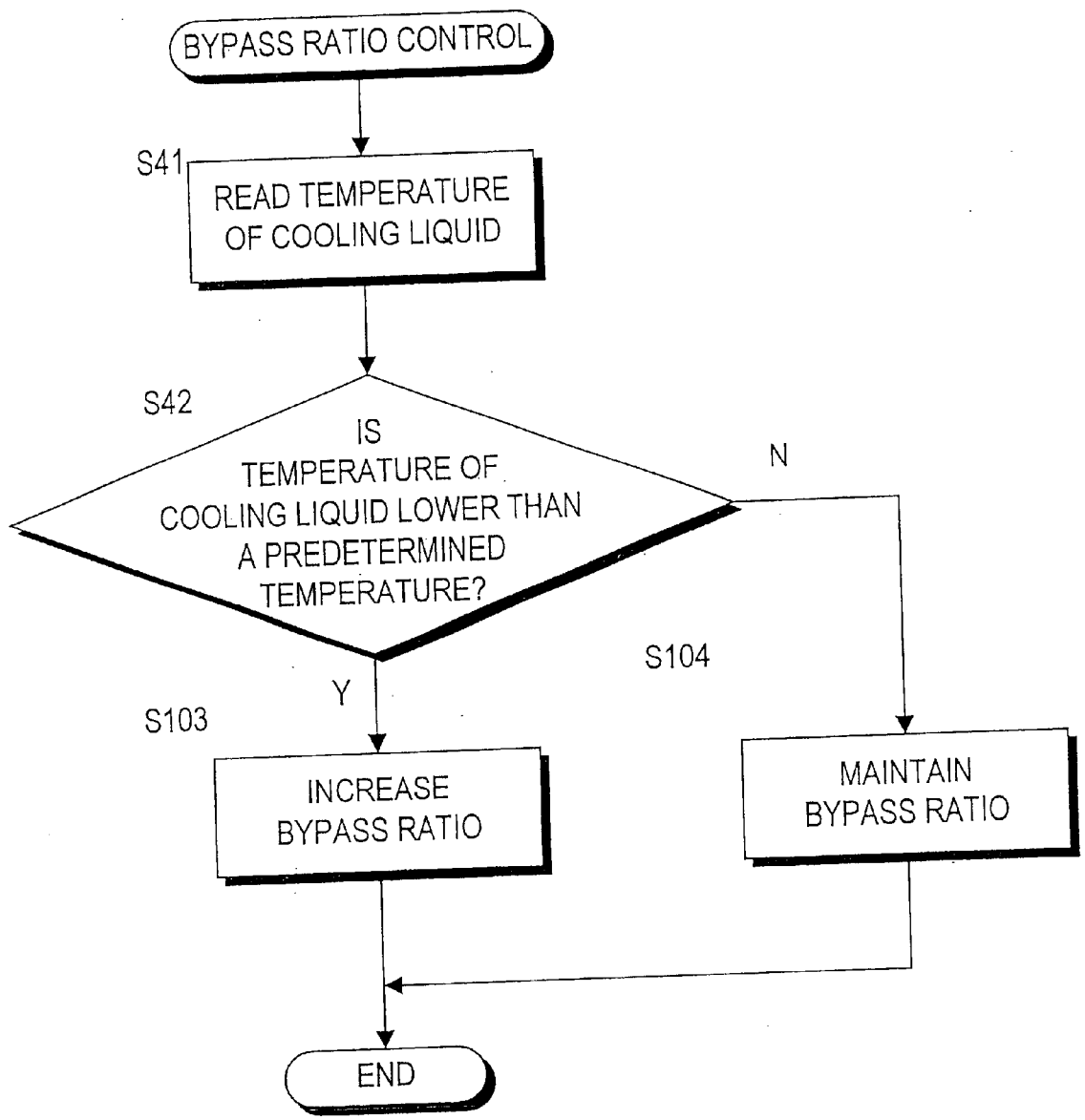
FIG. 11 is similar to FIG. 10 but showing an alternative routine for bypass ratio control performed by the controller according to the third embodiment of this invention.
Figure 18:
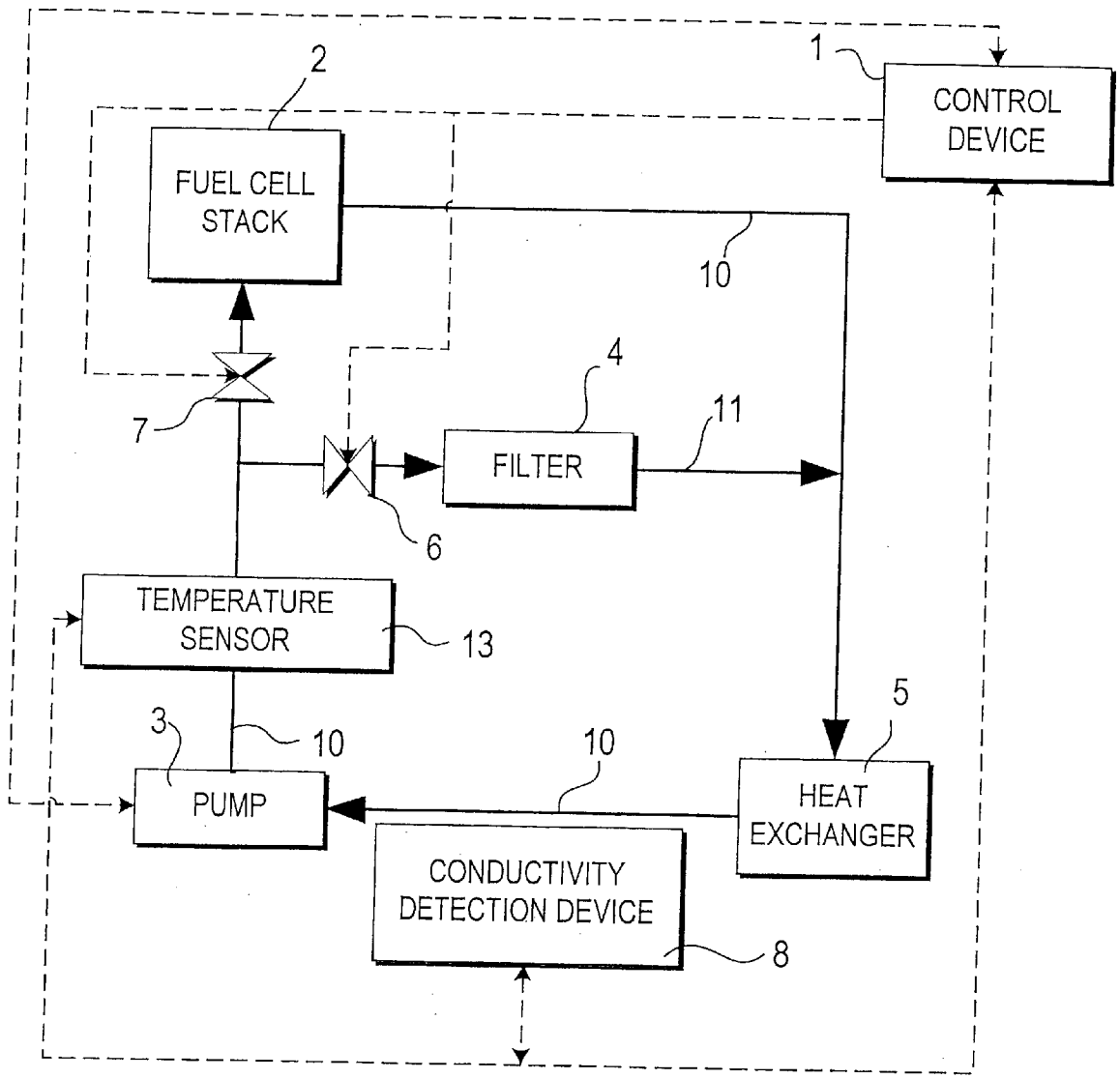
FIG. 18 is a schematic diagram of a fuel cell system according to a seventh embodiment of this invention.

Referring to FIG. 18, for example, the temperature of the cooling liquid is detected by a temperature sensor 13, and the aforesaid subroutine of FIG. 10 is modified as shown in FIG. 11.

Referring to FIG. 11, in a step S41, the temperature of the cooling liquid, which is detected by the temperature sensor 13, is read. Next, in a step S42, it is determined whether or not the detected temperature is lower than a predetermined temperature. The predetermined temperature is a value for determining if the motor has a margin for increasing the bypass ratio of the cooling liquid. The predetermined temperature is herein set to 80° C. for the following reason. The fuel cell stack 2 comprising polymer electrolyte fuel cells (PEFC) achieves its maximum performance when the temperature is about 80° C. So, when the temperature is less than 80° C., it can be assumed that the fuel cell system is not fully operated and that the motor of the recirculation pump 3 is also not fully operated. So it is determined that the motor has a margin for increasing the bypass ratio of the cooling liquid.

When the detected temperature is lower than the predetermined temperature in the step S42, the subroutine proceeds to the step S103. When the detected temperature is not lower than the predetermined temperature, the subroutine proceeds to the step S104.

It is also possible to asses the margin of the motor based on the discharge amount of the recirculation pump 3.

The bypass ratio of the cooling liquid may be increased on the following operating conditions for the fuel cell system. These are: (1) at fuel cell system startup where cooling requirements are non-existent or low since the fuel cell stack temperature is low, (2) at fuel cell system startup when conductivity has deteriorated as a result of not operating the device for a period of time before start-up, (3) when the heat generated by the stack is decreasing during idling running state of the vehicle, and (4) when pump load is low during braking of the vehicle.

Figure 12:
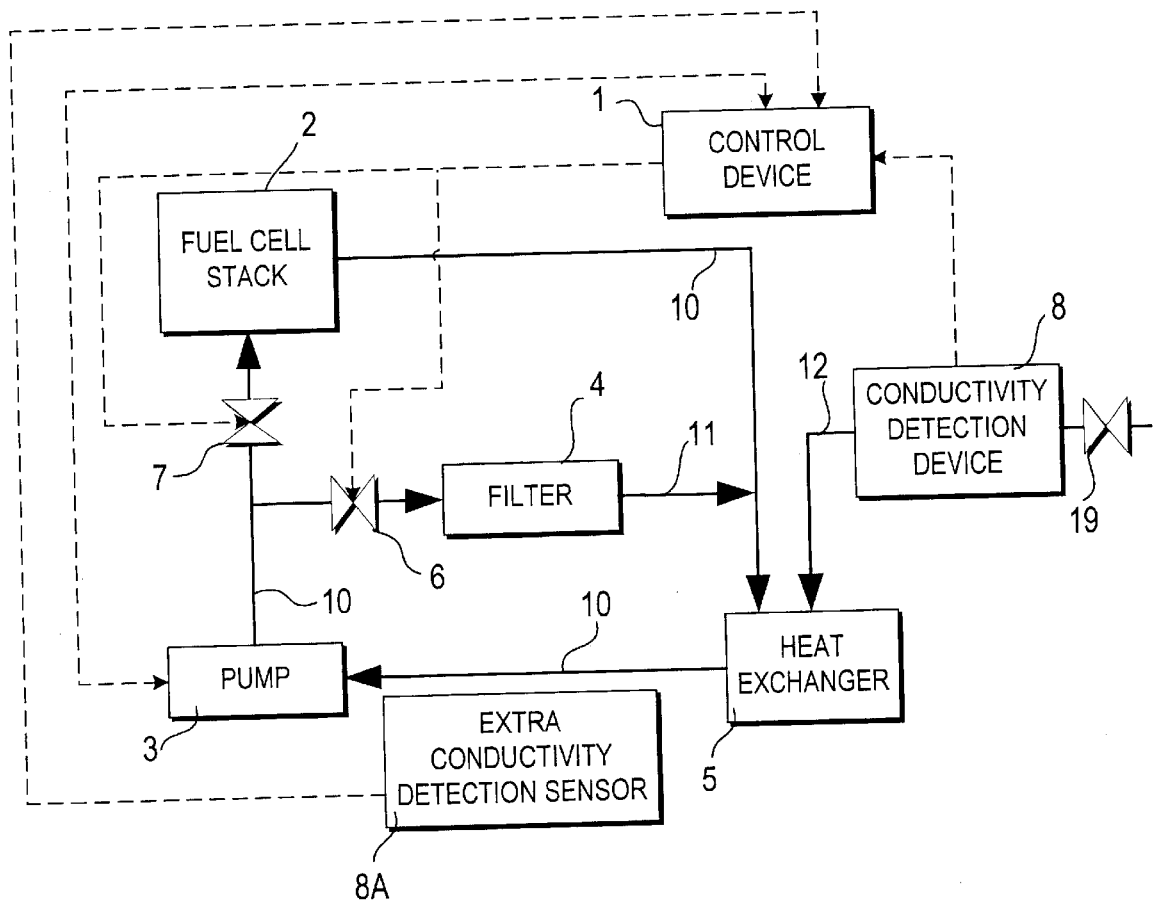
FIG. 12 is a schematic diagram of a fuel cell system according to a fourth embodiment of this invention.

Referring to FIG. 12, a fourth embodiment will be described. Although the fourth embodiment is similar to the first or the second embodiment, it differs from these embodiments in that the conductivity detection sensor 8 is not provided in the recirculation passage 10 but in an external passage 12. The external passage 12 is a passage introducing cooling liquid into the recirculation passage 10

When introducing the cooling liquid into the fuel cell system, the conductivity detection sensor 8 external to the recirculation passage 10 measures the conductivity of the cooling liquid. The control device 1 controls the flow amount of the cooling liquid flowing into the ion removal filter 4 based on the measured conductivity. By adding an extra conductivity detection sensor 8A to the recirculation passage 10, the control device 1 can correct the conductivity detected by the sensor 8A in the recirculation passage 10 based on an initial accurate conductivity for the cooling liquid measured by the conductivity detection sensor 8 outside the recirculation passage 10.

Figure 13:
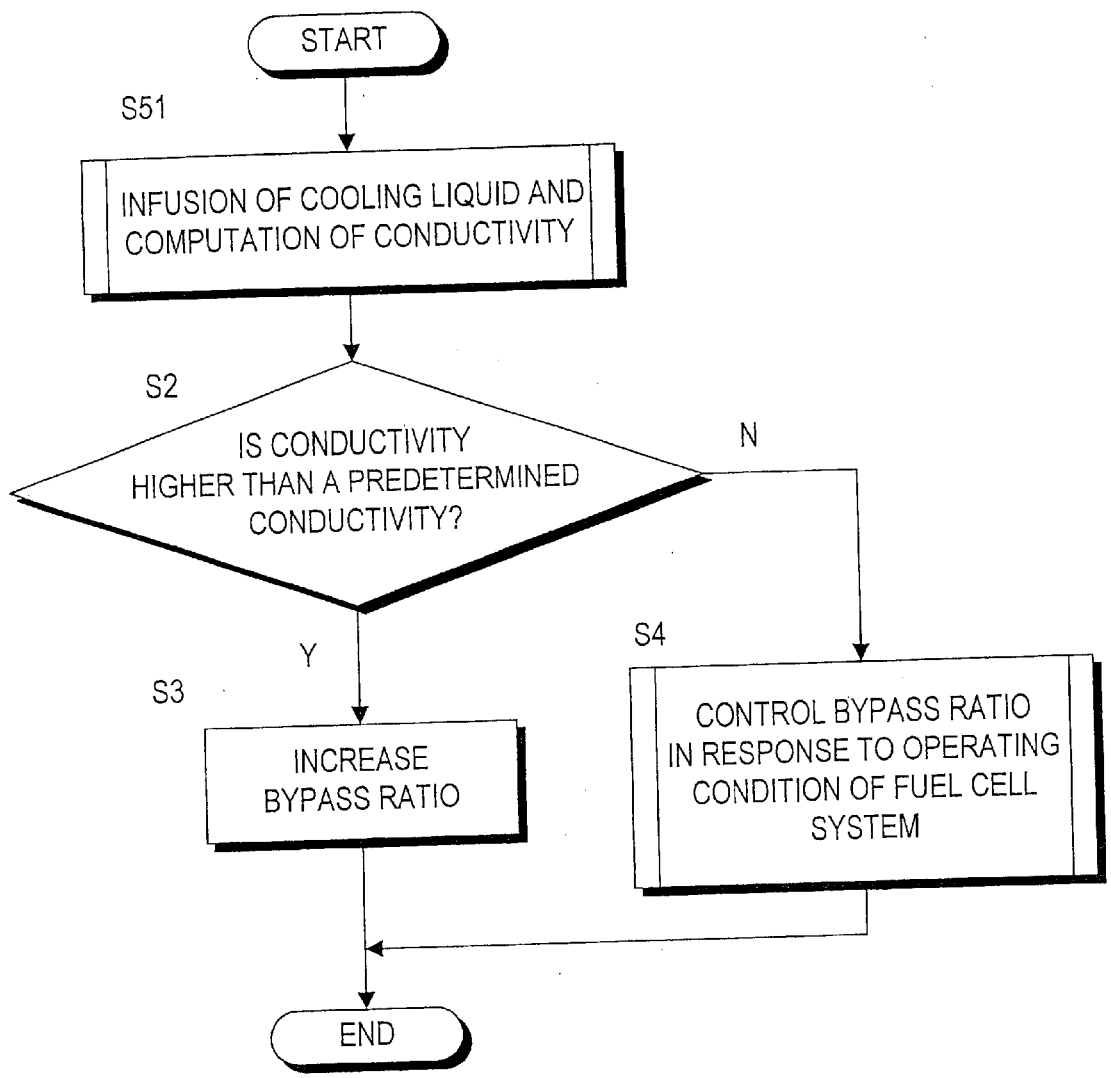
FIG. 13 is a flowchart describing a conductivity control routine performed by a controller according to the fourth embodiment of this invention.

Referring to the flowchart of FIG. 13, an example of the conductivity control routine when the conductivity detection sensor 8 is provided in the external passage 12 and an extra conductivity detection sensor 8A is provided in the recirculation passage 10 will now be described. This conductivity control routine is performed by the control device 1.

In a step S51, a subroutine for infusion of the cooling liquid and computation of conductivity is executed. The subsequent steps S2–S4 are identical to those of FIG. 3.

Figure 14:
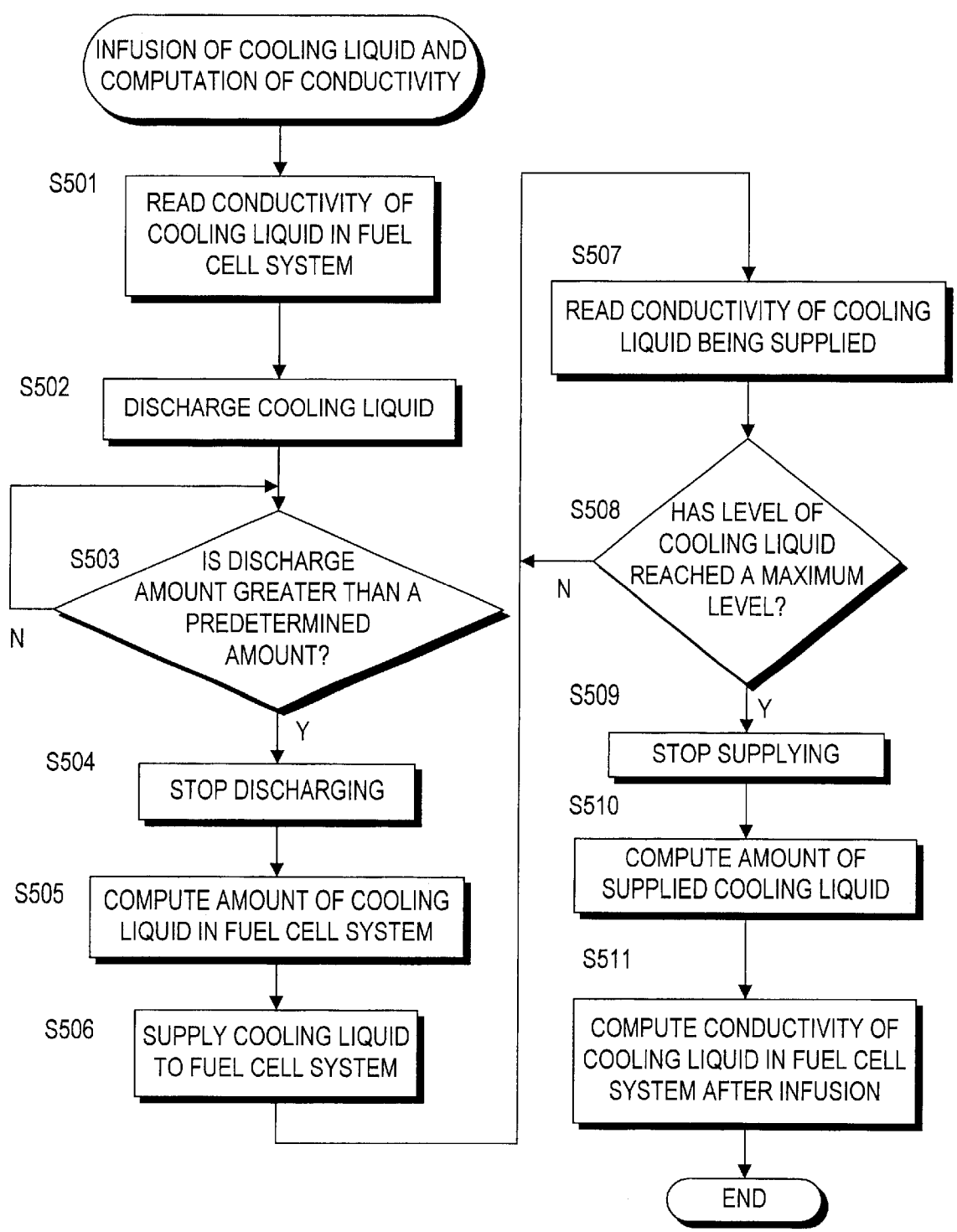
FIG. 14 is a flowchart describing a subroutine for infusion of cooling liquid and computation of conductivity performed by a controller according to the fourth embodiment of this invention.

The subroutine of the step S51 is shown in FIG. 14. In a step S501, the conductivity in the recirculation passage 10, which is measured by the extra conductivity detection sensor 8A, is read. At this time, the extra conductivity detection sensor 8A is soaked in the cooling liquid. In a step S502, a drain valve not shown is commanded to discharge the cooling liquid in the recirculation passage 10. In a step S503, it is determined whether or not the cooling liquid is discharged by a predetermined amount, based on the level of the cooling liquid detected by a level sensor not shown. Here, the predetermined amount is substantially equal to the amount of the cooling liquid which is due to be supplied to the fuel cell system from the external passage 12. Since the conductivity detection sensor 8 is disposed in the external passage 12, it is not soaked in the cooling liquid when the cooling liquid is discharged by the drain valve. When the cooling liquid is discharged by the predetermined amount, the subroutine proceeds to a step S504 where the discharge is stopped. At this time, the extra conductivity detection sensor 8A is above the surface of the cooling liquid.

In a step S505, the amount of the cooling liquid in the fuel cell system is computed by measuring level of the cooling liquid. In a step S506, a controllable inlet valve 19 is commanded to supply the cooling liquid to the fuel cell system from the external passage 12. In a step S507, the conductivity of the cooling liquid being supplied to the fuel cell system from the external passage 12 which is measured by the conductivity detection sensor 8 in the external passage 12 is read. In a step S508, it is determined whether or not the level of cooling liquid has reached a maximum level in the fuel cell system. In a step S509, when the level of cooling liquid has reached the maximum level, the supply of the cooling liquid is stopped.

In a step S510, the amount of the cooling liquid supplied from the external passage 12 is computed on the basis of the difference between the maximum level and the level measured in the step S505 before the supply of the cooling liquid. In a step S511, the conductivity of the cooling liquid in the fuel cell system is computed by means of a weighted average, on the basis of the conductivity and amount of the cooling liquid contained in the fuel cell system before the supply of cooling liquid as well as those of the cooling liquid that was newly supplied by the inlet valve 19.

According to this embodiment, since the conductivity detection sensor 8 is provided external to the system, it is possible to reduce the occurrence of component failure in the conductivity detection sensor 8 or mis-measurement by the conductivity detection sensor 8 resulting from increases in the temperature of the cooling liquid in the system. Furthermore, accurate measurement of the initial conductivity of the cooling liquid introduced into the system is possible. It is also possible to control the cooling liquid flowing into the ion removal filter 4 based on the initial accurate measurement of conductivity.

Figure 15:
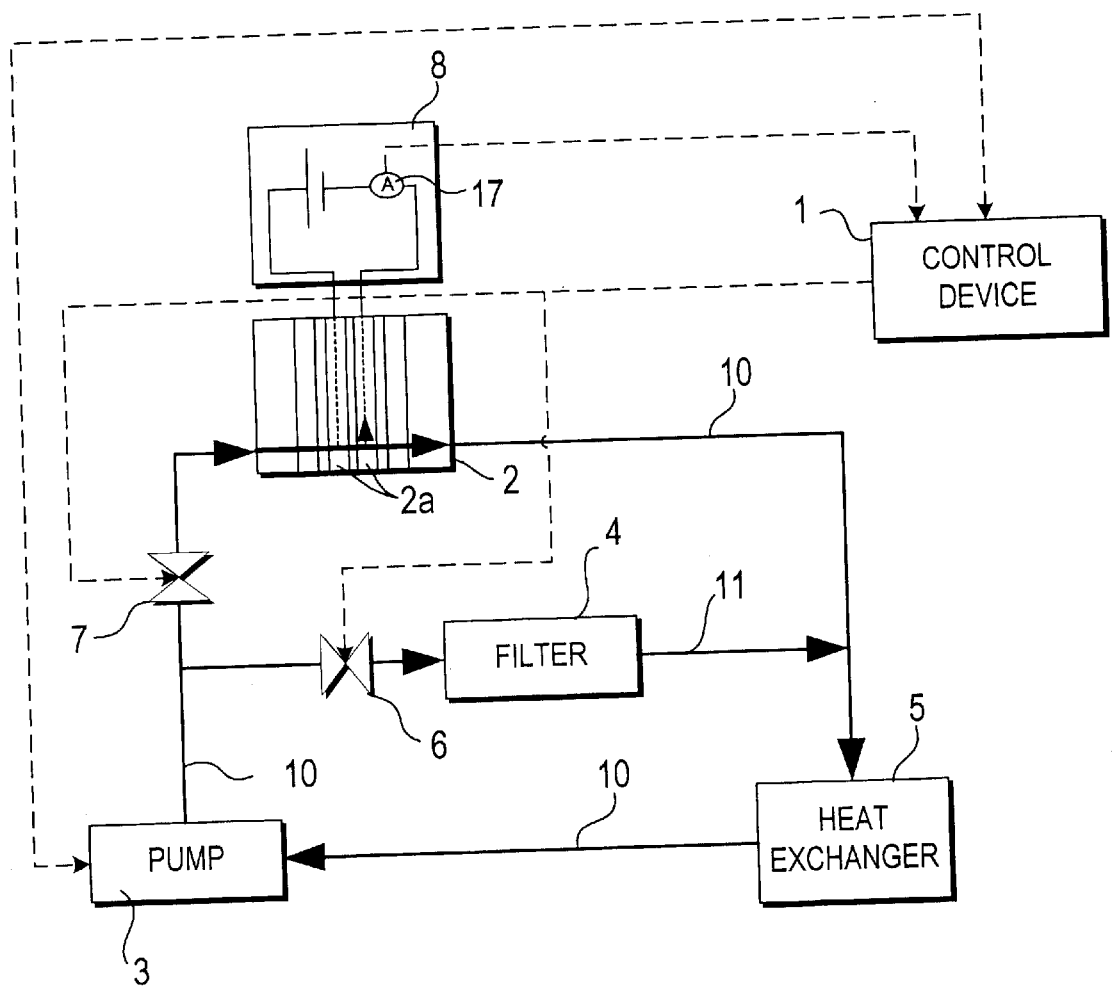
FIG. 15 is a schematic diagram of a fuel cell system according to a fifth embodiment of this invention.

FIG. 15 shows a fifth embodiment of this invention. In the fifth embodiment, the conductivity detection sensor 8 applies a voltage between adjacent separators in the fuel cell stack not yet operated. The fuel cell stack 2 comprises a plurality of fuel cells separated by the separators made of electrically conductive material. The control device 1 calculates the conductivity of the cooling liquid from the applied voltage and the detected current.

Referring to the figure, the conductivity detection sensor 8 applies a voltage between adjacent separators 2a in the fuel cell stack 2 before power generation or when power is not generated, and measures the current value between the separators 2a by a current sensor 17. The control device 1 calculates the conductivity of the cooling liquid based on data previously stored in the ROM related to the length and the shape of a cooling liquid passage formed through the separator and the measurement result above. Consequently, this embodiment allows measurement of the conductivity of the cooling liquid on each occasion the operation of fuel cell system is started. In this manner, it is possible to increase accuracy and frequency of conductivity measurement of the cooling liquid.

Figure 16:
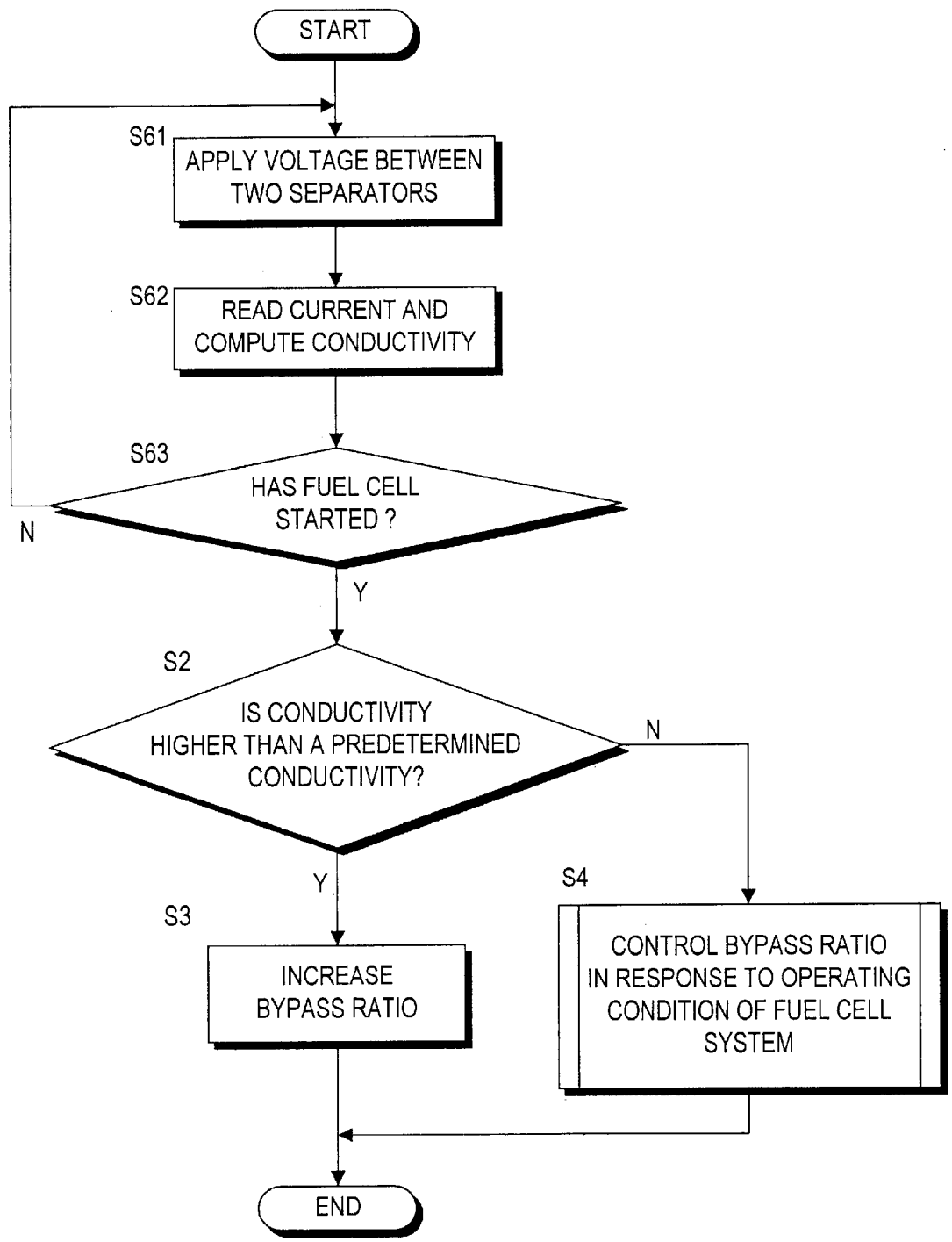
FIG. 16 is a flowchart describing a conductivity control routine performed by a controller according to the fifth embodiment of this invention.

Referring to the flowchart of FIG. 16, a conductivity control routine according the fifth embodiment will now be described. This conductivity control routine is performed by the control device 1.

In a step S61, a voltage is applied between adjacent separators in the fuel cell stack. In a step S62, the current flowing through the separator which is measured by a current sensor 17 is read. In a step S63, it is determined whether or not the operation of the fuel cell system has already started. When the operation of the fuel cell system has already started, the processes of the steps S2 to S4, which are identical to those of FIG. 3, are performed. When the fuel cell system is not in operation, the control device 1 repeats the process of the steps S61 through S63 until the operation of the fuel cell system starts.

Figure 17:
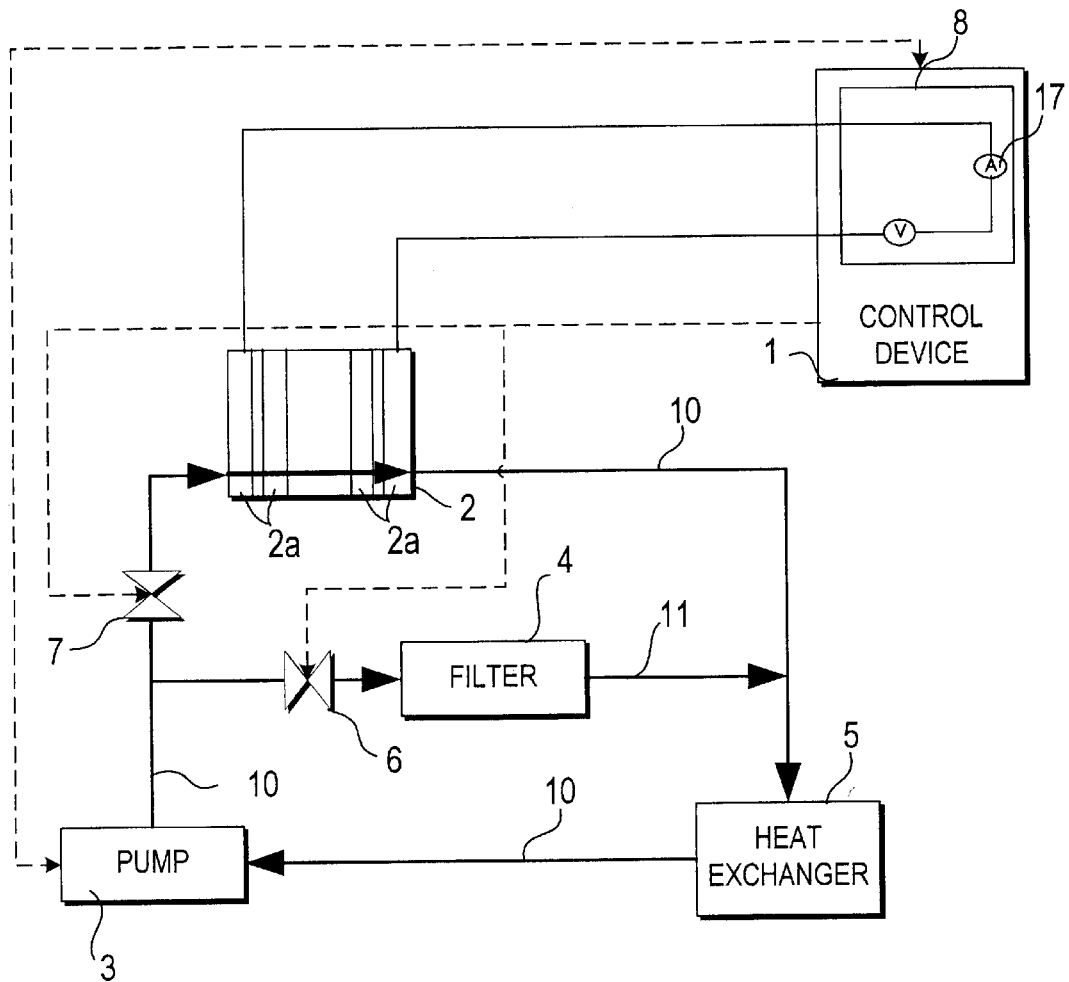
FIG. 17 is a schematic diagram of a fuel cell system according to a sixth embodiment of this invention.

FIG. 17 shows a sixth embodiment of this invention. In this embodiment, the conductivity sensor comprises a current meter 17, which is normally provided in the fuel cell system as well as a voltage meter. The current meter 17 detects the output current of the fuel cell stack 2 during power generation and the voltage meter 17 detects the voltage of the fuel cell stack 2. The control device 1 calculates the conductivity by comparing the detected output current with a reference current.

The control device 1 calculates the leakage current value to the cooling liquid from the output current of the fuel cell stack 2. The leakage current value is represented by the difference of the output current of the fuel cell stack 2 from the reference current. The reference current is the output current measured immediately after introducing cooling liquid into the system or during low conductivity. The conductivity of the cooling liquid can be calculated from the leakage current, the insulation range of the fuel cell stack 2 and the shape of the cooling liquid passage in the fuel cell stack 2. The insulation range of the fuel cell stack 2 and the shape of the cooling liquid passage in the fuel cell stack 2 can respectively be represented by numerical values which are prestored in the ROM of the control device 1. The control device 1 calculates the conductivity of the cooling liquid based on the difference between the output current and the reference current. In this manner, it is possible to detect the conductivity from the output current of the fuel cell stack 2 without providing a specific conductivity sensor.

FIG. 18 shows a seventh embodiment of this invention. In this embodiment, the conductivity of the cooling liquid is predicted, based on the temperature of the cooling liquid. Consequently, it is possible to make accurate estimations for the conductivity which take into account the tendency of the conductivity to deteriorate as a result of increases in the cooling liquid temperature.

The fuel cell system is provided with a temperature sensor 13 to measure the temperature of the cooling liquid supplied to the fuel cell stack 2. The control device 1 predicts the conductivity variation over time on the basis of the detected temperature. The conductivity depends on the activation state of the cooling liquid and the temperature of the cooling liquid represents the activation state thereof. The control device 1 predicts the conductivity from the temperature of the cooling liquid and controls the solenoid valves 6, 7 in response to the prediction. In this manner, the control device 1 controls the bypass ratio of the cooling liquid to the ion removal filter 4 and maintains a low level of conductivity.

Figure 19:
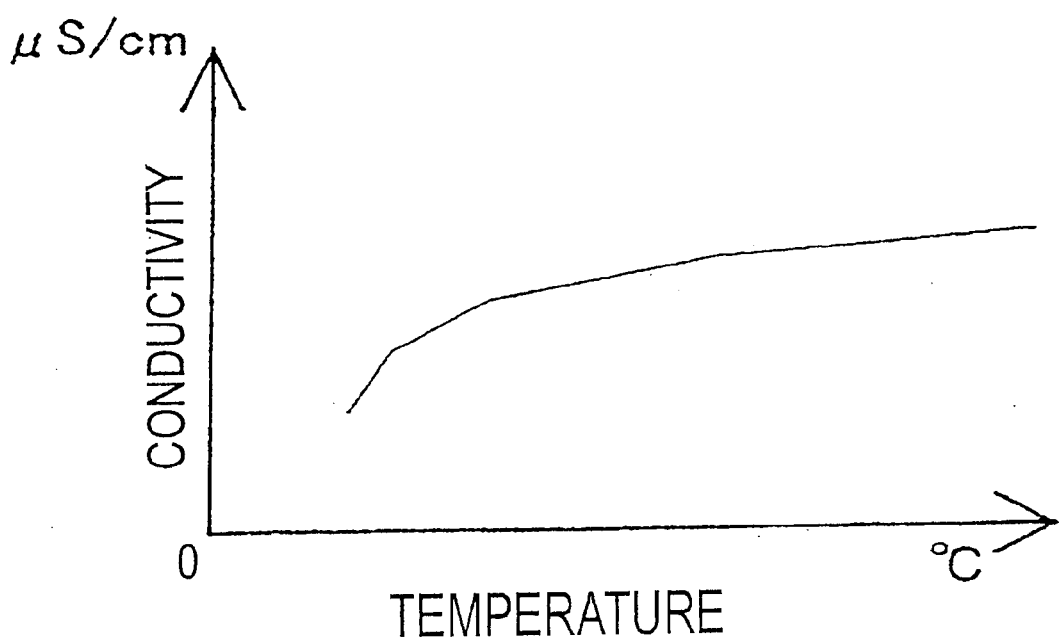
FIG. 19 is a map specifying a relationship between conductivity and cooling liquid temperature stored by a controller according to the seventh embodiment of this invention.
Figure 20:
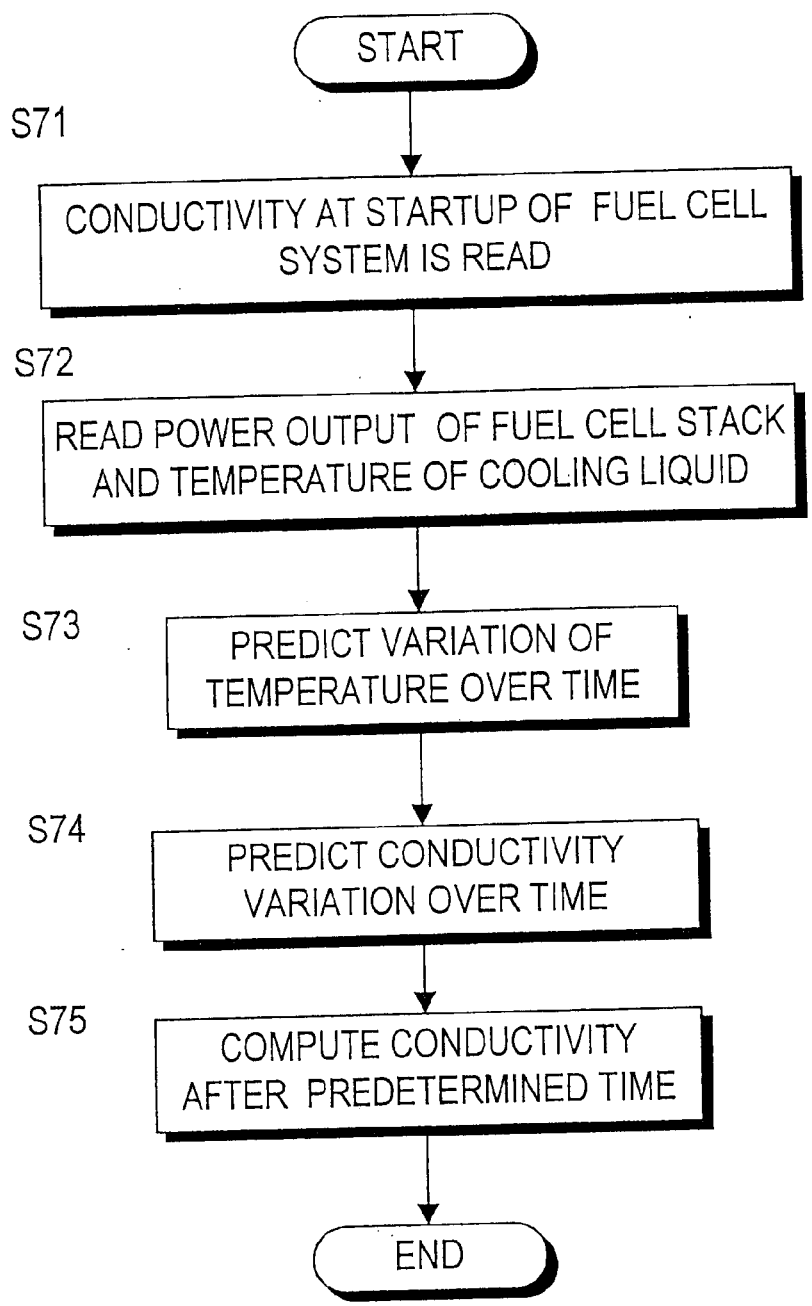
FIG. 20 is a flowchart describing a routine for predicting conductivity of the cooling liquid performed by the controller according to the seventh embodiment of this invention.

Referring to FIG. 19 and FIG. 20, the routine for predicting conductivity performed by the control device 1 will be described. FIG. 19 is a map showing the relationship of conductivity to cooling liquid temperature. FIG. 20 shows a flowchart of the routine for predicting conductivity.

The conductivity at startup of the fuel cell system is read in a step S71. In a step S72, the temperature of the cooling liquid and the power output of the fuel cell stack 2 is read. Thereafter, in a step S73, the future temperature variation over time is predicted based on historical temperature behavior, the fuel cell output, and the elapsed time after startup. In a step S74, the conductivity variation over time is computed by looking up the map shown in FIG. 19, using the measured conductivity when starting the fuel cell system, based on predicted temperature variation over time. In a step S75, the conductivity after the predetermined time has elapsed is computed. Herein the predetermined time is set to thirty seconds. The computed (predicted) conductivity is used in the step S21 of the conductivity control routine shown in the FIG. 8. Thus, it is possible to effectively control reduction of conductivity by monitoring the temperature variation of the cooling liquid in the above manner.

Figure 21:
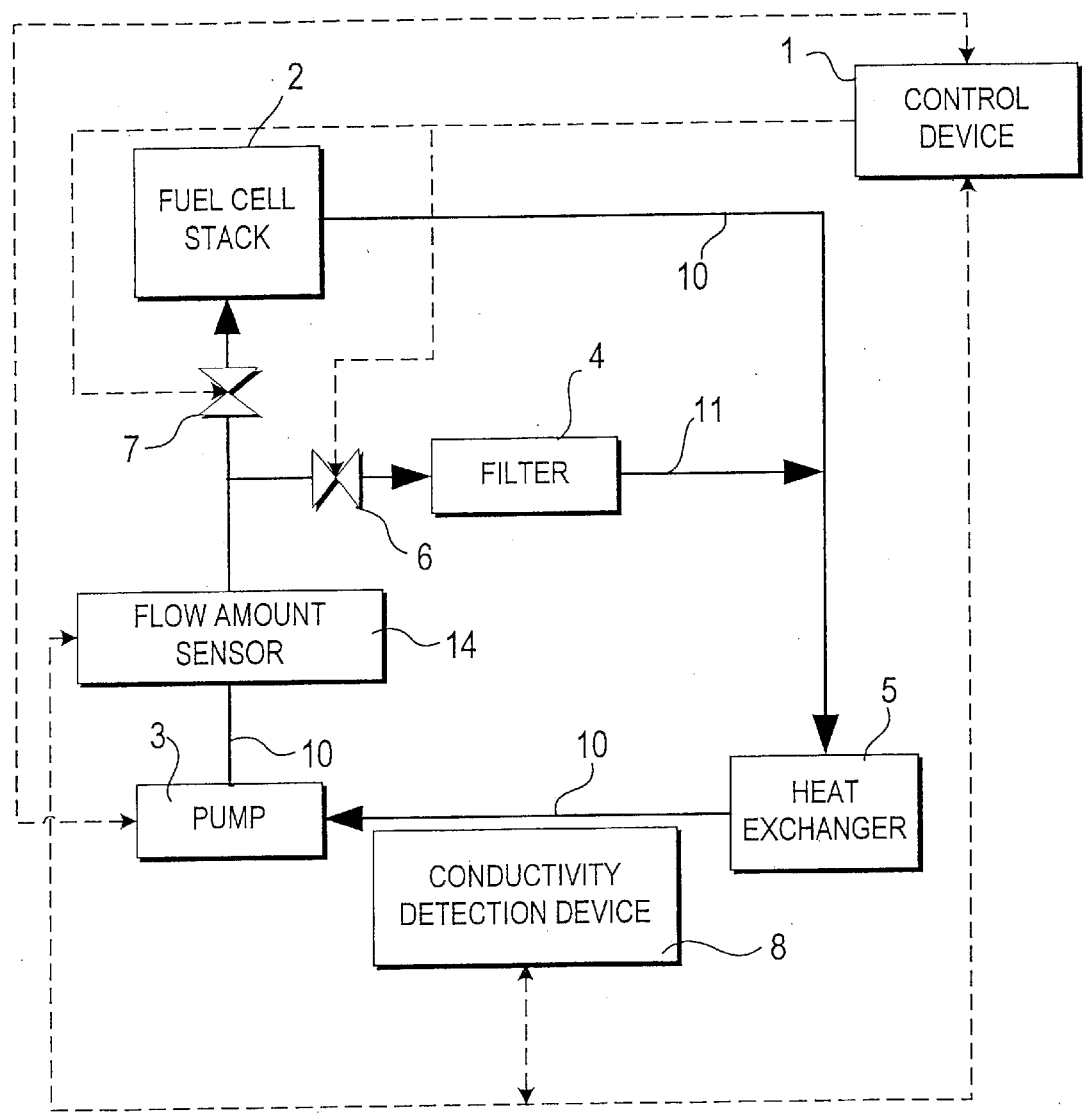
FIG. 21 is a schematic diagram of a fuel cell system according to an eighth embodiment of this invention.

FIG. 21 shows an eighth embodiment of this invention. In this embodiment, the control device 1 corrects the predicted conductivity obtained in the same way as that of the aforesaid second embodiment, taking into account the tendency of the conductivity to deteriorate as the flow amount of cooling liquid increases.

A fuel cell system according to this embodiment is provided with a flow amount sensor 14 which detects the flow amount of the cooling liquid. The control device 1 predicts the variation in conductivity based on the detected flow amount. In other words, the control device 1 predicts the variation in conductivity by taking into account the variation in the activation state of the cooling liquid as a result of the increase in flow amount. The solenoid valves 6, 7 are controlled in response to the predicted conductivity and this allows the bypass ratio for cooling liquid transferred to the ion removal filter 4 to be controlled and the conductivity to be maintained to a low level.

Figure 22:
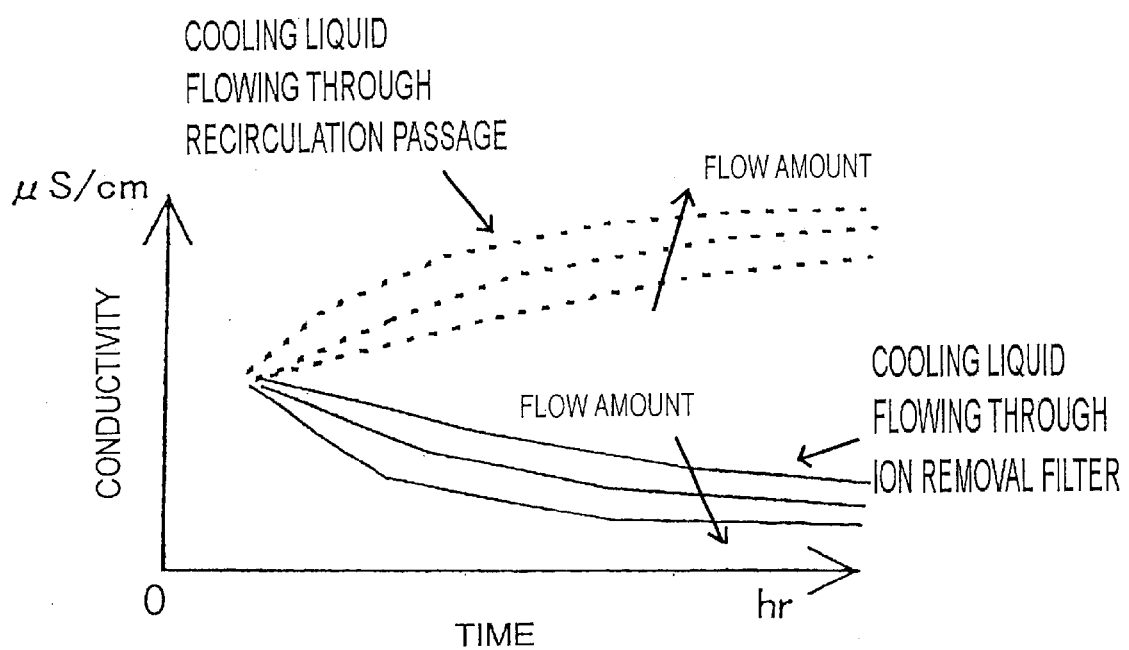
FIG. 22 is a map specifying a variation in conductivity with respect to the variation in flow amount of the cooling liquid, stored by a controller according to the eighth embodiment.
Figure 23:
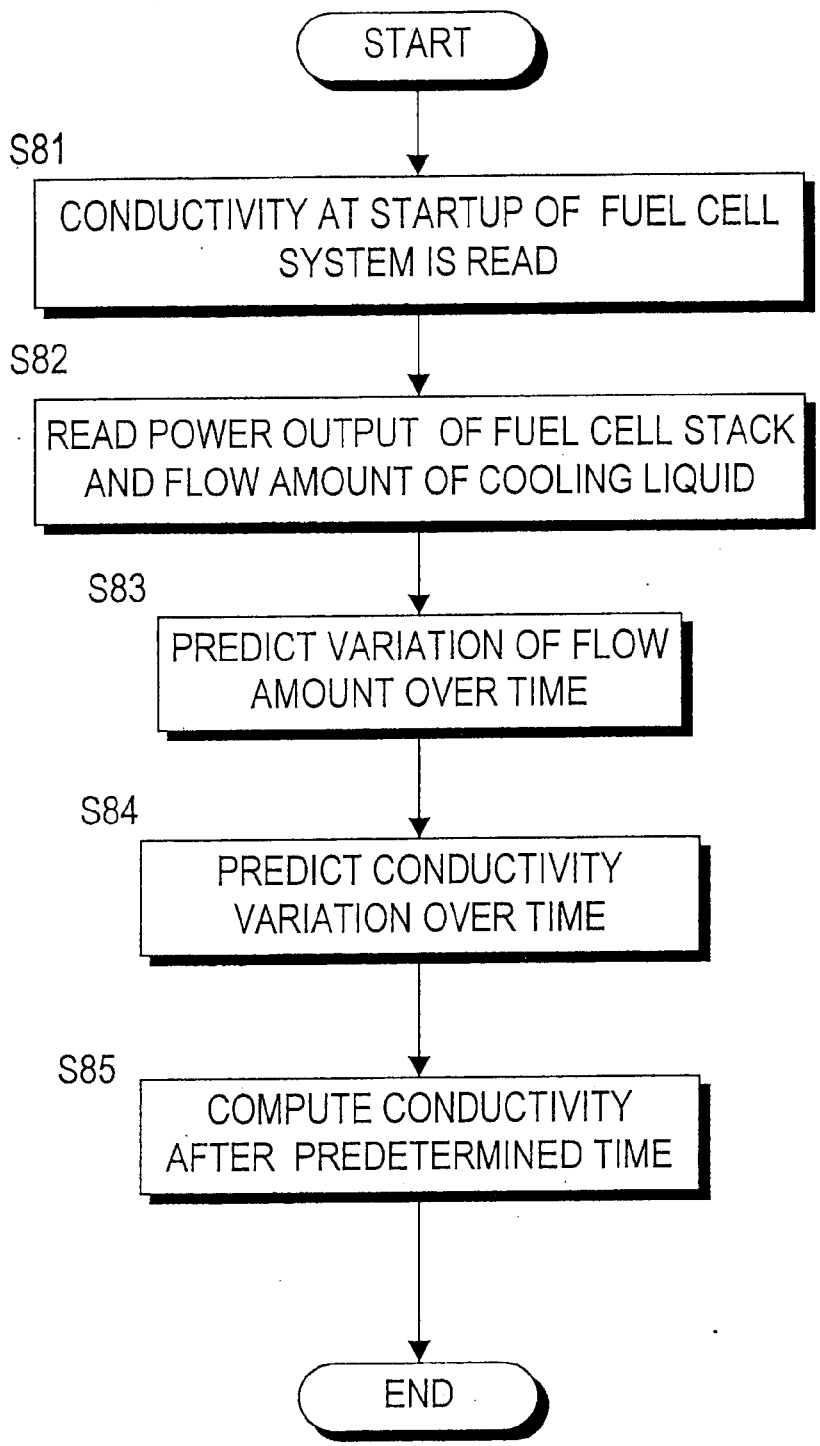
FIG. 23 is a flowchart describing a routine for predicting conductivity of the cooling liquid performed by the controller according to the eighth embodiment of this invention.

Referring to FIG. 22 and FIG. 23, a calculation routine for conductivity performed by the control device 1 will be described in further detail. FIG. 22 is a map showing the time-dependent variation in conductivity at several flow amounts. In FIG. 22, the conductivity of the cooling liquid flowing through recirculation passage 10 is shown by the broken line and the conductivity of the cooling liquid flowing through the ion removal filter 4 is shown by the solid line. The map in FIG. 22 is stored in the ROM of the control device 1. The map in FIG. 22 may be stored in the RAM and updated using data on the flow amount, bypass ratio, conductivity, and elapsed time which are detected in operation of the fuel cell stack 2. FIG. 23 is a flowchart of a routine for predicting conductivity performed by the control device 1.

The conductivity at startup of the fuel cell system is read in a step S81. In a step S82, the flow amount of the cooling liquid, the bypass ratio and the power output of the fuel cell stack 2 are read. Thereafter, in a step S83, the future variation in the flow amount is predicted based on historical cooling liquid flow amount behavior, the fuel cell output, and the elapsed time after start-up. In a step S84, the conductivity variation over time is computed by looking up the map shown in FIG. 22 using the measured conductivity when starting the fuel cell system based on a predicted flow amount variation over time and the bypass ratio. In a step S85, the conductivity after a predetermined time has elapsed is computed. The predetermined time is herein set to thirty seconds. The predicted conductivity is used in the step S21 of the conductivity control routine shown in the FIG. 8. Thus, it is possible to effectively reduce conductivity by monitoring the flow amount variation of the cooling liquid.

Figure 24:
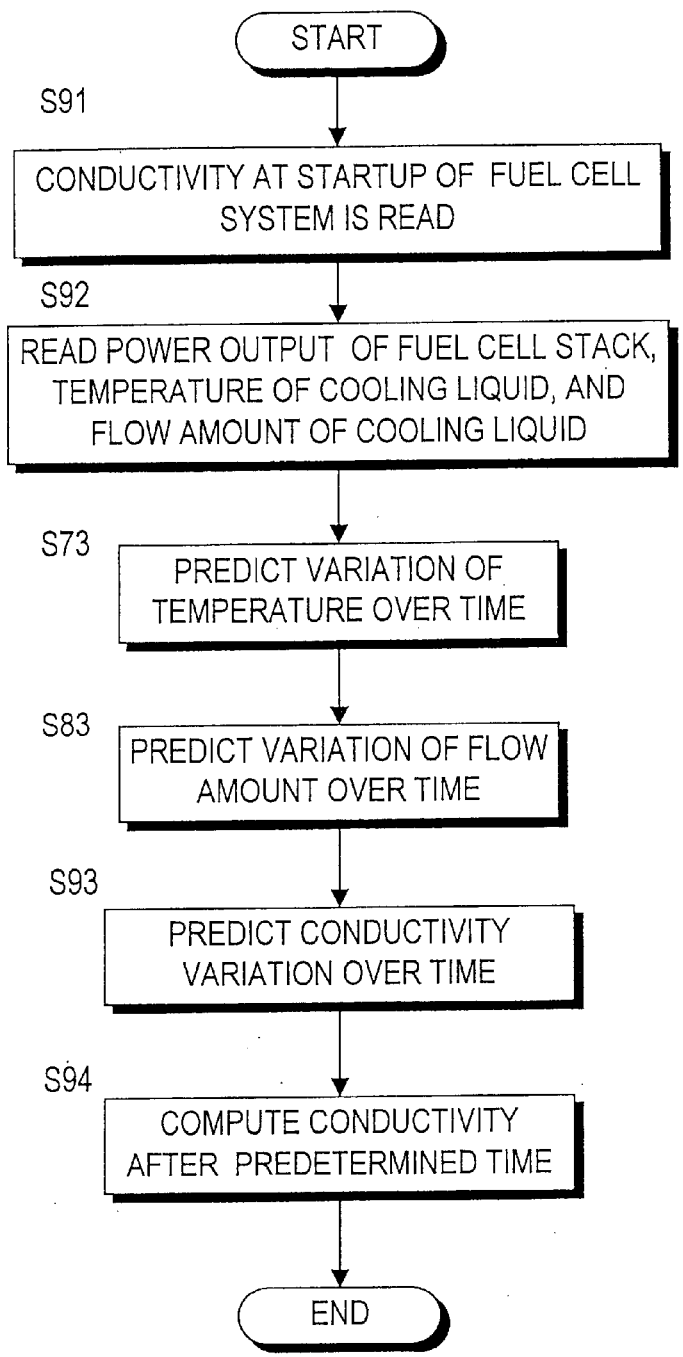
FIG. 24 is a flowchart describing a routine for predicting conductivity of the cooling liquid performed by the controller according to a ninth embodiment of this invention.

Referring to FIG. 24, a ninth embodiment of this invention will be described. In this embodiment, an accurate prediction of the conductivity can be performed, taking into account the tendency of the conductivity to increase as the temperature and the flow amount of cooling liquid increases. FIG. 24 is a flowchart of a routine for predicting conductivity performed by the control device 1.

In a step S91, the conductivity at startup of the fuel cell system is read. In a step S92, the temperature of the cooling liquid, the flow amount of the cooling liquid, the bypass ratio, and the power output of the fuel cell stack 2 are read. Thereafter, in a step S73, the future temperature variation over time is predicted based on historical temperature behavior, the output of the fuel cell stack 2, and the elapsed time after startup of the operation of the fuel cell system. Next, in a step S83, the future variation in the flow amount is predicted based on historical cooling liquid flow amount behavior, the output of the fuel cell stack 2, and the elapsed time after start-up of the operation of the fuel cell system. In a step S93, the conductivity variation over time is computed, based on the maps shown in FIG. 19 and FIG. 22. The step S93 corresponds to the combination of the step S74 and S84. In a step S94, the conductivity after a predetermined time has elapsed is computed. Herein the predetermined time is set to thirty seconds. The predicted conductivity is used in the step S21 of the conductivity control routine shown in the FIG. 8. Thus, it is possible to effectively reduce conductivity by monitoring the temperature variation and flow amount variation of the cooling liquid.

The entire contents of Japanese Patent Application P2001-113495 filed Apr. 12, 2001 are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A cooling device using a cooling medium for a fuel cell stack, comprising:
   a heat exchanger which cools the cooling medium;
   a cooling passage through which the cooling medium is circulated between the fuel cell stack and the heat exchanger;
   a pump which pressurize the cooling medium in the cooling passage for circulation;
   a bypass passage which bypasses the fuel cell stack to directly circulate a part of the cooling medium discharged from the pump to the heat exchanger;
   an electrical conductivity reducing mechanism which reduces an electrical conductivity of the cooling medium passing through the bypass passage;
   a valve which regulates a bypass amount of the cooling medium passing through the bypass passage;
   a sensor which detects an electrical conductivity of the cooling medium; and
   a programmable controller programmed to:
      determine if the electrical conductivity is larger than a predetermined conductivity;
      control the valve to increase the bypass amount when the electrical conductivity is larger than the predetermined conductivity;

determine if a predetermined condition related to an operation of the fuel cell stack holds; and control the valve to prevent the bypass amount from becoming zero when the electrical conductivity is not larger than the predetermined conductivity and the predetermined operation condition holds.

2. The cooling device as defined in claim 1, wherein the device further comprises a sensor which detects an operation condition of the pump, and the controller is further programmed to determine if the predetermined operation condition holds based on an output signal of the operation condition detecting sensor.

3. The cooling device as defined in claim 2, wherein the operation condition detecting sensor comprises a sensor which detects a load on the pump, and the controller is further programmed to determine that the predetermined operation condition holds when the load is not larger than a predetermined load.

4. The cooling device as defined in claim 2, wherein the operation condition detecting sensor comprises a temperature sensor which detects a temperature of the cooling medium, and the controller is further programmed to determine that the predetermined operation condition holds when the temperature is not higher than a predetermined temperature.

5. The cooling device as defined in claim 1, wherein the controller is further programmed to store a variation pattern of the electrical conductivity, predict a future value of the electrical conductivity from a current value of the electrical conductivity by referring to the variation pattern, determine if the future value is larger than the predetermined conductivity, control the valve to increase the bypass amount when the future value is larger than the predetermined conductivity, and control the valve to prevent the bypass amount from becoming zero when the future value is not larger than the predetermined conductivity and the predetermined condition holds.

6. The cooling system as defined in claim 5, wherein the device further comprises a temperature sensor which detects a temperature of the cooling medium, and the controller is further programmed to store a plurality of variation patterns of the electrical conductivity according to the temperature of the cooling medium, and apply one of the variation patterns corresponding to the temperature detected by the temperature sensor to predict the future value of the electrical conductivity.

7. The cooling system as defined in claim 6, wherein the device further comprises a sensor which detects an electrical current output from the fuel cell stack, and the controller is further programmed to predict a future temperature based on a current temperature of the cooling medium and a current electrical current output from the fuel cell stack, and apply one of the variation patterns corresponding to the future temperature to predict the future value of the electrical conductivity.

8. The cooling system as defined in claim 5, wherein the device further comprises a discharge amount sensor which detects an amount the cooling medium discharged from the pump, and the controller is further programmed to store a plurality of variation patterns of the electrical conductivity according to the discharge amount, and apply one of the variation patterns corresponding to the discharge amount detected by the discharge amount sensor to predict the future value of the electrical conductivity.

9. The cooling system as defined in claim 8, wherein the device further comprises a sensor which detects an electrical current output from the fuel cell stack, and the controller is further programmed to predict a future discharge amount based on a current discharge amount of the cooling medium and an electrical current output from the fuel cell stack, apply one of the variation patterns corresponding to the future discharge amount to predict the future value of the electrical conductivity.

10. The cooling device as defined in claim 1, wherein the device further comprises an external passage which supplies the cooling medium to the cooling passage from outside and the electrical conductivity detecting sensor comprises a sensor which detects the electrical conductivity of the cooling medium in the external passage.

11. The cooling device as defined in claim 1, wherein the fuel cell stack comprises a stack of fuel cells in which each cell is separated by a separator from another cell and a passage of the cooling medium is formed passing through each separator, and the electrical conductivity detecting sensor comprises a sensor which applies a voltage between two separators in a state where the fuel cell stack does not operate and detects the electrical conductivity of the cooling medium by measuring an electrical current between the two separators.

12. The cooling device as defined in claim 1, wherein the electrical conductivity detecting sensor comprises a sensor which detects an electrical current output from the fuel cell stack in operation and the controller is further programmed to detect the electrical conductivity of the cooling medium by a comparison of the electrical current with a predetermined reference current corresponding to the electrical current output from the fuel cell stack when the electrical conductivity of the cooling medium is not larger than the predetermined conductivity.

13. A cooling device using a cooling medium for a fuel cell stack, comprising:

a heat exchanger which cools the cooling medium;

a cooling passage through which the cooling medium is circulated between the fuel cell stack and the heat exchanger;

a pump which pressurize the cooling medium in the cooling passage for circulation;

a bypass passage which bypasses the fuel cell stack to directly circulate a part of the cooling medium discharged from the pump to the heat exchanger;

an electrical conductivity reducing mechanism which reduces an electrical conductivity of the cooling medium passing through the bypass passage;

a valve which regulates a bypass amount of the cooling medium passing through the bypass passage;

a sensor which detects an electrical conductivity of the cooling medium;

means for detecting an electrical conductivity of the cooling medium;

means for determining, if the electrical conductivity is larger than a predetermined conductivity;

means for controlling the valve to increase the bypass amount when the electrical conductivity is larger than the predetermined conductivity;

means for determining if a predetermined condition related to an operation of the fuel cell stack holds; and means for controlling the valve to prevent the bypass amount from becoming zero when the electrical conductivity is not larger than the predetermined conductivity and the predetermined operation condition holds.

14. A control method for a cooling device which cools a fuel cell stack of a fuel cell system, the device comprising a heat exchanger which cools the cooling medium, a cooling passage through which the cooling medium is circulated between the fuel cell stack and the heat exchanger, a pump which pressurize the cooling medium in the cooling passage for circulation, a bypass passage which bypasses the fuel cell stack to directly circulate a part of the cooling medium discharged from the pump to the heat exchanger, an electrical conductivity reducing mechanism which reduces an electrical conductivity of the cooling medium passing through the bypass passage, a valve which regulates a bypass amount of the cooling medium passing through the bypass passage, the method comprising detecting an electrical conductivity of the cooling medium;

determining if the electrical conductivity is larger than a predetermined conductivity;

controlling the valve to increase the bypass amount when the electrical conductivity is larger than the predetermined conductivity;

determining if a predetermined condition related to an operation of the fuel cell stack holds; and controlling the valve to prevent the bypass amount from becoming zero when the electrical conductivity is not larger than the predetermined conductivity and the predetermined operation condition holds.

* * * * *